(12) United States Patent  (10) Patent No.: US 9,230,239 B2
Chen et al.  (45) Date of Patent: Jan. 5, 2016

(54) METHOD AND SYSTEM FOR PROVIDING PERFORMANCE METRICS

(75) Inventors: Andrew Chen, Austin, TX (US); Jacy Legault, Austin, TX (US); Jon Loyens, Austin, TX (US)

(73) Assignee: Bazaarvoice, Inc., Austin, TX (US)

( * ) Notice: Subject to any disclaimer, the term of this patent is extended or adjusted under 35 U.S.C. 154(b) by 369 days.

(21) Appl. No.: 12/698,510

(22) Filed: Feb. 2, 2010

(65) Prior Publication Data

US 2010/0205550 A1  Aug. 12, 2010

Related U.S. Application Data

(60) Provisional application No. 61/150,150, filed on Feb. 5, 2009.

(51) Int. Cl.
| | | |
|---|---|---|
| *G06F 3/048* | (2013.01) | |
| *G06F 3/01* | (2006.01) | |
| *G06Q 10/10* | (2012.01) | |
| *G06Q 30/02* | (2012.01) | |

(52) U.S. Cl.
CPC ............... *G06Q 10/10* (2013.01); *G06Q 30/02* (2013.01)

(58) Field of Classification Search
CPC .................................. G06F 3/048; G06F 3/01
USPC ................................................. 715/760, 811
See application file for complete search history.

(56) References Cited

U.S. PATENT DOCUMENTS

| | | | |
|---|---|---|---|
| 5,528,490 A | 6/1996 | Hill | |
| 5,761,649 A | 6/1998 | Hill | |
| 5,999,908 A | 12/1999 | Abelow | |
| 6,029,142 A | 2/2000 | Hill | |
| 6,236,994 B1 | 5/2001 | Swartz et al. | |
| 6,757,682 B1 | 6/2004 | Naimark et al. | |
| 6,785,671 B1 | 8/2004 | Bailey et al. | |
| 6,999,962 B2 | 2/2006 | Julliard et al. | |
| 7,133,834 B1 | 11/2006 | Abelow | |
| 7,143,089 B2 | 11/2006 | Petras et al. | |
| 7,222,078 B2 | 5/2007 | Abelow | |
| 7,343,294 B1 | 3/2008 | Sandholm et al. | |

(Continued)

FOREIGN PATENT DOCUMENTS

| | | |
|---|---|---|
| WO | 2007047691 | 4/2007 |
| WO | 2007050234 | 5/2007 |
| WO | 2007059096 | 5/2007 |

OTHER PUBLICATIONS

"You're It," a blog on tagging at http://www.tagsonomy.com/, printed Dec. 12, 2007, 13 pgs.

(Continued)

*Primary Examiner* — Tadeese Hailu
*Assistant Examiner* — Darrin Hope
(74) *Attorney, Agent, or Firm* — Meyertons, Hood, Kivlin, Kowert & Goetzel, P.C.

(57) ABSTRACT

Systems and methods to facilitate the collection and processing of content generated by users are disclosed. Specifically, in one embodiment, user generated content may be aggregated from multiple retailers. This user generated content may be processed to obtain a variety of statistical data associated with the user generated content, including an importance metric. This importance metric may be utilized to rank the products of the manufacturer such that statistical, or other, data related to the manufacturer's products may be presented to a user in the order of product importance.

22 Claims, 19 Drawing Sheets

(56) References Cited

U.S. PATENT DOCUMENTS

| | | | |
|---|---|---|---|
| 7,409,362 B2 | 8/2008 | Calabria | |
| 7,428,496 B1 | 9/2008 | Keller et al. | |
| 7,519,562 B1 | 4/2009 | Vander Mey et al. | |
| 7,620,565 B2 | 11/2009 | Abelow | |
| 7,620,651 B2 | 11/2009 | Chea et al. | |
| 7,720,835 B2 | 5/2010 | Ward et al. | |
| 7,908,173 B1 | 3/2011 | Hill | |
| 7,908,176 B1 | 3/2011 | Hill | |
| 7,930,363 B2 | 4/2011 | Chea et al. | |
| 7,937,391 B2 | 5/2011 | Chea et al. | |
| 8,001,003 B1* | 8/2011 | Robinson et al. | 705/14.53 |
| 8,214,261 B2 | 7/2012 | Chen et al. | |
| 8,321,300 B1 | 11/2012 | Bockius et al. | |
| 2002/0023144 A1* | 2/2002 | Linyard et al. | 709/218 |
| 2002/0107861 A1 | 8/2002 | Clendinning et al. | |
| 2002/0112035 A1 | 8/2002 | Carey et al. | |
| 2002/0165905 A1 | 11/2002 | Wilson | |
| 2003/0088452 A1 | 5/2003 | Kelly | |
| 2004/0143600 A1 | 7/2004 | Musgrove et al. | |
| 2004/0230511 A1 | 11/2004 | Kannan et al. | |
| 2005/0044197 A1 | 2/2005 | Lai | |
| 2006/0069564 A1 | 3/2006 | Allison et al. | |
| 2006/0129446 A1 | 6/2006 | Ruhl et al. | |
| 2006/0143068 A1 | 6/2006 | Calabria | |
| 2006/0230064 A1 | 10/2006 | Perkowski | |
| 2006/0235966 A1 | 10/2006 | Rossow et al. | |
| 2006/0282326 A1 | 12/2006 | Lombardi | |
| 2007/0050245 A1 | 3/2007 | Humphries et al. | |
| 2007/0078833 A1 | 4/2007 | Chea et al. | |
| 2007/0112760 A1 | 5/2007 | Chea et al. | |
| 2007/0150537 A1 | 6/2007 | Graham | |
| 2007/0169096 A1 | 7/2007 | Chea et al. | |
| 2007/0174247 A1 | 7/2007 | Xu et al. | |
| 2007/0192155 A1 | 8/2007 | Gauger | |
| 2007/0244888 A1 | 10/2007 | Chea et al. | |
| 2007/0266023 A1 | 11/2007 | McAllister et al. | |
| 2008/0004942 A1 | 1/2008 | Calabria | |
| 2008/0005103 A1 | 1/2008 | Ratcliffe et al. | |
| 2008/0005223 A1 | 1/2008 | Flake et al. | |
| 2008/0097835 A1 | 4/2008 | Weiser | |
| 2008/0109232 A1 | 5/2008 | Musgrove et al. | |
| 2008/0133488 A1 | 6/2008 | Bandaru et al. | |
| 2008/0140577 A1 | 6/2008 | Rahman et al. | |
| 2008/0189274 A1 | 8/2008 | Mann | |
| 2008/0201643 A1 | 8/2008 | Nagaitis et al. | |
| 2008/0222003 A1 | 9/2008 | Adstedt et al. | |
| 2008/0244431 A1 | 10/2008 | Chea et al. | |
| 2008/0301055 A1 | 12/2008 | Borgs et al. | |
| 2009/0037412 A1 | 2/2009 | Bard et al. | |
| 2009/0063247 A1 | 3/2009 | Burgess et al. | |
| 2009/0070228 A1* | 3/2009 | Ronen | 705/26 |
| 2009/0276233 A1 | 11/2009 | Brimhall et al. | |
| 2009/0281870 A1* | 11/2009 | Sun et al. | 705/10 |
| 2009/0299824 A1 | 12/2009 | Barnes | |
| 2010/0114744 A1 | 5/2010 | Gonen | |
| 2010/0114883 A1 | 5/2010 | Chea et al. | |
| 2010/0121849 A1* | 5/2010 | Goeldi | 707/736 |
| 2010/0131384 A1 | 5/2010 | Chen et al. | |
| 2010/0205549 A1 | 8/2010 | Chen et al. | |
| 2011/0093393 A1 | 4/2011 | Chang et al. | |
| 2012/0109714 A1 | 5/2012 | Azar | |
| 2012/0179752 A1 | 7/2012 | Mosley et al. | |
| 2012/0246014 A1 | 9/2012 | Chen et al. | |
| 2012/0310831 A1 | 12/2012 | Harris et al. | |
| 2013/0007012 A1 | 1/2013 | Selkowe Fertik et al. | |
| 2013/0085804 A1 | 4/2013 | Leff et al. | |

OTHER PUBLICATIONS

Arrington, Michael "Profile: DinnerBuzz," Jun. 2005, 4 pgs., at http://www.techcrunch.com/2005/07/03/profile-dinnerbuzz/, printed on Dec. 12, 2007.

AdamNation tagging blog posted on Jul. 28, 2005 at http://adam.easyjournal.com/entry.aspx?eid=2632426 printed on Dec. 12, 2007, 5 pgs.

PeerPressure >> Scrumptious blog, dated Mar. 22, 2005, at http://www.allpeers.com/blog/?page_id=71, printed Dec. 12, 2007, 19 pgs.

Golder, Scott A. and Huberman, Bernardo A., "The Structure of Collaborative Tagging Systems," Information Dynamics Lab, HP Labs, Aug. 18, 2005, 8 pgs.

Arrington, Michael, Amazon Tags, Nov. 14, 2005, at http://www.techcrunch.com/2005/11/14/amazon-tags/, printed Dec. 12, 2007, 7 pgs.

Ugoretz, Joseph, "Three Stars and a Chili Pepper: Social Software, Folksonomy, and User Reviews in the College Context," Academic Commons, Jun. 9, 2006, at http://www.academiccommons.org/commons/essagy/Ugoretz-social-software-folksonomy, printed Dec. 12, 2007, 5 pgs.

Beach, David and Gupta, Vivek, Yahoo! Search Blog: Social Commerce via the Shoposphere & Pick Lists, Nov. 14, 2005, at http://www.ysearchblog.com/archives/000214.html, printed Dec. 12, 2007, 4 pgs.

Kroski, Ellyssa, "The Hive Mind: Folksonomies and User-Based Tagging," Dec. 7, 2005, at http://infotangle.blogsome/2005/12/07/the-hive-mind-folksonomies-and-user-based-tagging/, printed Dec. 12, 2007, 15 pgs.

Xu Zhichen, Yun Fu, Jianchang Mao and Difu Su, "Towards the Semantic Web: Collaborative Tag Suggestions," Yahoo! Inc., Santa Clara, CA, 8 pgs, in WWW2006: Proceedings of the Collaborative Web Tagging Workshop, 2006.

International Search Report and Written Opinion for PCT Application No. PCT/2010/000288, completed Mar. 18, 2010, mailed Mar. 31, 2010, 8 pgs.

Bazaarvoice, "Sephora.com Launches "Ratings & Reviews," Bringing Even More Information Than Ever to Beauty Seekers," San Francisco, CA, Sep. 4, 2008 [retrieved Mar. 18, 2010 from URL: http://bazaarvoice.com/press-room/us-press-room/268-pressreleasephpid67], 2 pgs.

European Search Report for European Patent Application No. 09825479.0, mailed Mar. 27, 2012, 5 pgs.

Notice of Allowance for U.S. Appl. No. 12/614,016, mailed May 9, 2012, 4 pgs.

Prospero Unveils New Hosted Community Application for Custom-Branded Rating and Reviews: PR Newswire, New York, Feb. 13, 2006, 1 pg. at http://proquest.umi.com/pqdweb?did=985933201&sid=15&Fmt=3&clientId=19649&RQT=309&VName=PQD.

Notice of Allowance for U.S. Appl. No. 12/243,679, mailed Jul. 5, 2012, 13 pgs.

Corrected Notice of Allowability for U.S. Appl. No. 12/243,679, mailed Jul. 19, 2012, 13 pgs.

Office Action for U.S. Appl. No. 13/492,642, mailed Sep. 11, 2012, 7 pgs.

International Search Report and Written Opinion for International Patent Application No. PCT/US2009/063560, mailed Dec. 31, 2009, 7 pgs.

Hoegg, R. et al., "Overview of Business Models for Web 2.0 communities", GeNeMe 2006, Dresden, Germany, Oct. 2006, 17 pgs.

Qui, G. et al. "Incorporate the Syntactic Knowledge in Opinion Mining in User-Generated Content" Zhejiang University, Apr. 22, 2008, 26 pgs.

"User Generated Content, Research Brief", Feb. 2008, produced by Resource Interactive and BazaarVoice, 7 pgs.

Office Action for U.S. Appl. No. 12/614,016, mailed Jul. 28, 2010, 12 pgs.

Office Action for U.S. Appl. No. 12/243,679, mailed Nov. 30, 2010, 14 pgs.

www.Bazaarvoice.com—Overview (http://web.archive.org/web/20070408141819/bazaarvoice.com/overview.html).

www.Bazaarvoice.com—Solution (http://web.archive.org/web/20070409104639/bazaarvoice.com/solution.html).

www.Bazaarvoice.com—Syndicate Voice (http://web.archive.org/web/20070202125252/bazaarvoice.com/SyndicateVoice.html).

Office Action for U.S. Appl. No. 12/614,016, mailed Dec. 22, 2010, 6 pgs.

(56) References Cited

OTHER PUBLICATIONS

Office Action for U.S. Appl. No. 12/614,016, mailed Jun. 21, 2011, 7 pgs.
Office Action for U.S. Appl. No. 12/243,679, mailed Aug. 3, 2011, 16 pgs.
Office Action for U.S. Appl. No. 12/614,016, mailed Oct. 26, 2011, 8 pgs.
Office Action for U.S. Appl. No. 12/243,679, mailed Dec. 27, 2011, 15 pgs.
Office Action for U.S. Appl. No. 12/614,016, mailed Feb. 8, 2012, 9 pgs.
European Search Report in Application No. 10738846.4 dated Jan. 21, 2013, 5 pages.
Office Action in U.S. Appl. No. 13/492,642 dated Feb. 22, 2013, 7 pages.
Office Action in U.S. Appl. No. 12/698,447 issued Jan. 16, 2013, 21 pages.
Office Action in U.S. Appl. No. 13/407,358 mailed Sep. 23, 2014, 12 pages.

* cited by examiner

BrandAnswers Home

Bazaarvoice Intelligence Platform

Bazaarvoice Amplification Suite
- BrandAnswers
- Home
- Options
- Settings
- User Management
- Change Password

Performance Summary

Unanswered Questions

Zoom: 1d 5d 1m 3m 5m 1y Max

610

☐ Questions Asked  ☒ Questions Answered    February 06, 2008

(chart with B: Asked, A: Answered across Feb 1–Wed)

474 total unanswered questions

Open Questions

● Questions without answers   ○ Questions without brand answers   ○ All questions   ☑ Ignored Questions

| Retailer ▼ | Category | Questions |
|---|---|---|
| Walmart | Ink And Toner | 28 |
| Walmart | Blood Pressure | 25 |
| Walmart | Compact Cameras | 92 |
| Walmart | Surround Sound 5.1 And Up | 92 |
| Walmart | Dvd Recorder Combo | 114 |
| BestBuy | Home Theatre Networking | 126 |
| BestBuy | Televisions | 22 |
| Buy | Televisions | 10 |
| Overstock | Phones | 21 |
| Argos | Phones | 1 |
| Sky Mall | Compact Cameras | 10 |
| Total | | 474 |

620

Quick Actions

| Critical categories | open questions |
|---|---|
| Surround Sound 5.1 And Up | 126 |
| Dvd Recorder Combo | 114 |
| Compact Cameras | 82 |
| Ink And Toner | 29 |
| Blood Pressure | 25 |

630

Oldest Unanswered Question

Days: 2, 120

Product: 12345 Samsung Fancy Television

Q: Does Samsung pay shipping for defect?

Details: If I buy this TV and it is defective and I want to take advantage of the manufacturer's warranty, will Samsung pay for shipping for the defective TV?

[Answer] [Ignore]

©2005–2009 Bazaarvoice, Inc.

Bazaarvoice Intelligence Platform

Test Environment STG
logged in to TestCustomer  Logout | Feedback

BrandAnswers Category

Bazaarvoice Integration Suite

Bazaarvoice Amplification Suite dAnswers
s
ngs Management
e Password

< Back to BrandAnswers Home

Open Questions: Blood Pressure

○ Questions without answers   ● Questions without brand answers   ○ All questions   ☐ Show full questions
☑ Ignored Questions brand answers

[                    ]  710

| Date ▼ | Product | Question | Answer | Quick Answer | | |
|---|---|---|---|---|---|---|
| △ 01/08/09 | Samsung Healthy Living Deluxe Wrist Monitor | What is the wrist measurement for this product? | 0 | [          ] | Answer | Unignore |
| ▽ 04/23/09 | Samsung Healthy Living Premium Deluxe Blood Pressure Monitor | Is the software that comes with this blood pressure monitor compatible with Windows Vista? If not, is there a patch I can download? | 2 | Excellent question. We actually offer drivers, software updates, and other downloads at Samsung.com. Just click on the "software" tab on our home page and then enter the name of this product | Submit | Ignore |

× Cancel

Question Information    Other answers

ID 12458    Yes, this is compatible with Windows 2000, XP, and Vista. It is also compatible with Mac
Author SuzieQ    By JohnDoe - FL Mead, MD - 05/01/09  Approved
Location Dallas    I think so.
   By Harriette - Dallas, TX - 04/30/09  Approved

| △ 01/08/09 | Samsung Deluxe Blood Pressure Monitor | Does this pinch? I want to buy this for my elderly mother. but she is very frail and I'm afraid the belt that goes around her arm will pinch or squeeze too hard. She had a bad experience once in a drugstore in which the... show full question | 1 | [          ] | Answer | Ignore |

Your answer has been submitted  View answer    712

©2005-2009 Bazaarvoice, Inc

FIG. 8A

Bazaarvoice
Intelligence Platform

Test Environment STG
logged in to TestCustomer
Logout | Feedback

BrandAnswers Category

<< Back to BrandAnswers Home
Open Questions: Blood Pressure

○ Questions without answers  ● Questions without bran
☑ Ignored Questions brand answers

| Date ▼ | Product | | |
|---|---|---|---|
| △ 01/08/09 | Samsung Healthy Living Deluxe Wrist Monitor | | [ Answer ] [ Unignore ] |

Answer Preview
How might we leverage non-FTE staff to answer community questions?

*jonathanc* from *7 months ago*
Could we enable moderators to do this?

TestUser from Test Location
Sed luctus venenatis arcu id elementum. Ut quis diam quis tellus rhoncus vestibulum aenean suscipit. Sed luctus venenatis arcu id elementum. Ut quis diam quis tellus rhoncus vestibulum aenean suscipit. Sed luctus venenatis arcu id elementum. Ut quis diam quis tellus rhoncus vestibulum aenean suscipit. Sed luctus venenatis arcu id elementum. Ut quis diam quis tellus rhoncus vestibulum aenean suscipit. Sed luctus venenatis arcu id elementum. Ut quis diam quis tellus rhoncus vestibulum aenean suscipit.

[ Edit ] [ Cancel ] [ Submit ]  <u>810</u>

| ▽ 04/23/09 | Samsung Healthy Living Premium Deluxe Blood Pressure Monitor | 1 | [ Answer ] [ Ignore ] |
| △ 01/08/09 | Samsung Deluxe Blood Pressure Monitor | | [ Submit ] [ Ignore ] |

Does this pinch?
I want to buy this for my elderly mother, but she is very frail and I'm afraid the belt that goes around her arm will pinch or squeeze too hard. She had a bad experience once in a drugstore in which the... show full question ©2005–2009 Bazaarvoice, Inc

○ Best Buy - Question and Answer - Mozilla Firefox  □■

🔗 http://reviews.bestbuy.com/answers/3545mha/content/popup.htm?bvpage=http%3A%2F%2Freviews.bestbuy.com%2Fanswers%2F3545mha%

▷ Multi room operation                                                              0 answers ▷ Can I get other streaming media , eg MLB.com?                                     0 answers ▷ can these speakers be mounted to the ceiling and pointed down to the floor at an angle?  1 answer

▷ How to enable blockbuster and music streaming.                                    0 answers ▷ Internet Hookup?                                                                  1 answer

▷ How can I connect the System wireless??                                           0 answers ▽ BD Wise                                                                           1 answer

Q: I am using the player with a new Samsung TV. BD Wise turns on as the manual states and sets the resolution. When I played a DVD it put it in 480?? When I manually set it to 1080P it stayed and looked great. Any idea on why BD wise would set it at 480?

Also when I played a Blueray disc BD Wise set it to 1080. It did not show whether it was 1080P or 1080i though. Should I just leave the resolution for all discs manually set at 1080P?

Category: *features*

4 days ago by Anonymous

[ Answer Question ]

0 👆 0                                                                               ⊘

Answers

[ SAMSUNG  Ambassador ] — 920

A: I'm sorry you are having an issue with your device. Although with the information you have provided I do not have a solution for you (manually keeping it at 1080p would be a good idea); I will say that if you contact your local Best Buy's Geek Squad, they should be able to provide you with a live solution.
-MrSamsung 4 days ago by MrSamsung - SamsungHQ 💬 (read all my Q&A)

0 👆 0                                                                               ⊘

Customer Q&A Exchange

| Q&A Home | Browse Q&A | Search Q&A |

Search all questions for this product   [ Search ]

[−] All (40 Questions : 44 Answers)        Sort by:  No. of Answers   Recent As   Recent Qs ▷ Is this a flatbed scanner/printer/fax?                                      1 answer ▽ Is this the wireless printer or the regular 6500?                           1 answer
   *1 month ago*
   By Anonymous

[ ANSWER THIS QUESTION ]                                   0 👍   0 👎   🚩

Answers
   A: The wireless version of the Officejet 6500 is named the Officejet 6500
   Wireless All-in-One.
   *1 month ago*
   Answered By  *hp*  910

By HPAnswers - Upstate, NY                              1 👍   0 👎   🚩

▷ Is this printer compatible with Windows 7 operating system?                 1 answer
▷ Do faxes received have to be printed or can they be viewed on the computer first?  1 answer
▷ Can you enlarge and reduce on the HP Officejet 6500 All-In-One? If so, how?  1 answer

[ ASK A NEW QUESTION ]    See Guidelines              1 2 3 4 5 ... 8 next >>

METHOD AND SYSTEM FOR PROVIDING PERFORMANCE METRICS

RELATED APPLICATIONS

This application claims a benefit of priority to U.S. Provisional Patent Application No. 61/150,150 entitled "Method and System for Providing Manufacturers with Content Generation Capabilities and Pertinent Statistical Data" by Andrew Chen and Sam Decker filed Feb. 5, 2009.

TECHNICAL FIELD

This disclosure relates generally to obtaining and presenting data. More particularly, this disclosure relates to the presentation of data to a manufacturer. Even more specifically, this disclosure relates to providing analytics, statistical data, or other data, to a manufacturer.

BACKGROUND

Today's consumer is inundated with advertising. In fact, advertising is so ubiquitous it is often times ignored. What is more, many people lack the belief that companies tell the truth in advertisements. As a result, word of mouth marketing and advertising has become increasingly important with respect to the sales of certain products. Word of mouth refers to the passing of information, especially recommendations, but also general information. In the context of advertising and marketing, the use of word of mouth may mean passing information between consumers or other entities, including manufacturers, experts, retailers, etc. to convey aspects or merits of a product or service, or the experience one person has related to that product or service, or related products or services.

The emergence of the importance of word of mouth marketing and advertising has coincided with the use of the Internet for researching, shopping and purchasing of products. Thus, online marketing and advertising has also become increasingly important. The use of word of mouth marketing in an online setting may therefore be an effective method for such online advertising, as consumer recommendations allow word of mouth advertising to be disseminated either online or offline.

In fact, according to a 2007 global Nielsen survey, consumer recommendations are the most credible form of advertising, as cited by 78% of the study's respondents. When businesses enable customers, or other types of users, to write reviews, ask or answer questions from the community, or share experiences, they create content that become powerful forms of marketing, and in particular, as discussed above, word of mouth marketing.

This view has been widely reinforced by many retailers (retailers will be used herein to refer to any type of seller of product or service, for example both online and brick and mortar) who report that products with relatively more reviews sell better and are returned less often. Thus, user generated content (comprising any information such as text, audio, video, or other information carrying medium generated by a user who is a consumer (of goods, a product, website, service, purchaser of the product, etc.)) may be extremely important to manufacturers, retailers or other sellers of a product or service (collectively referred to herein as a product) as user generated content may allow products to be differentiated and sales of products increased.

As this user generated content may include such things as user reviews, user stories, ratings, comments, problems, issues, question/answers, or other type of content which, for example, a user is allowed to compose or submit through any medium, there may be many methods and locations (for example, online or offline) where a user may be allowed to generate content and the user content generated may be provided in a wide variety of mediums or formats the distribution of this user generated content may be difficult. In fact, in many cases user generated content may be more effectively generated or gathered at one location and more effectively utilized at a different location. Thus, the effective collection and distribution of user generated content may be important to both manufacturers and retailers of products, as utilization of such user generated content may increase sales of these products. Thus, the effective collection and distribution of user generated content may be important to both manufacturers and retailers of products, as utilization of such user generated content may increase sales of these products.

As such, in many cases, retailers or manufacturers may provide customers the ability to produce such user generated content. These retailers or manufacturers may, however, produce or sell a wide variety of products. As a consequence it may be difficult to build up a critical mass of user generated content (enough to effect purchasing or other consumer decisions) with respect to any particular one product.

Every day, consumers are faced with frustrating barriers to purchasing. They get close to making a purchase decision, but are hindered by critical questions they need answered to feel like they are making an informed and confident purchase. Unfortunately, with the velocity of today's consumer marketplace, product marketing, product documentation, customer support, and channel marketing frequently fall short of consumer needs and expectations. A July 2008 study by Retail Systems Research underscores the insufficiency—52% of respondents cited that the number one challenge facing retailers today is keeping product information and availability up to date. The cost of not keeping product information up to date is diminished customer loyalty and trust, increased call center volume, missed opportunity for conversion, and, ultimately, long-term damage to the brand.

A manufacturer may thus desire to monitor aspects of the generation of content in conjunction with their products or other aspects of the presentation and sales of their products at the various retailers' sites. Accordingly, systems and methods for the collection, processing and presentation of such data are desired.

SUMMARY

Systems and methods to facilitate the collection and processing of content generated by users are disclosed. Specifically, in one embodiment, user generated content may be aggregated from multiple retailers. This user generated content may be processed to obtain a variety of statistical data associated with the user generated content. This statistical data may be refined according to one or more criteria (also referred to a filters) to allow only statistical data associated with those criteria to be presented.

Certain embodiments may therefore be usefully applied to determine statistical data. In one embodiment, an importance metric (referred to also as a "BrandIndex") may be calculated for a set of the manufacturer's products. The importance metric for a product may be calculated by weighting various statistical data associated with that product or by counting (for example determining a volume of user generated content). This importance metric may be utilized to rank the products of the manufacturer such that statistical, or other, data related to the manufacturer's products (as determined by the importance metric) may be presented to a user in the order of product importance.

To present such data then, in certain embodiments a manufacturer portal may be provided such that the statistical data may be presented through this portal. The presented data may be associated with one or more products, brands, categories, etc. offered by the manufacturer, or other criteria such as the importance metric, content code, rating, date, etc., such that the presented data may be filtered according to one or more of the associated criteria. The statistical data may be presented graphically in a variety of formats desired by a user. Furthermore, different statistical data may be presented simultaneously through the portal allowing direct comparisons to be made between the two sets of statistical data.

In one embodiment, a method for processing user generated content in a system comprising a set of retailers coupled to a content processing system may include receiving user generated content associated with a plurality of products, where the first user generated content was generated at a plurality of web sites associated with different retailers; an importance metric associated with each of the products may be determined based on a portion of the user generated content associated with the product and the set of products ordered based on the importance metric associated with each of the set of products.

In particular, in certain embodiments the user generated content may comprise reviews with associated ratings such that the importance metric may be determined based on a first sum of all ratings in the plurality of reviews for the product which were generated more than 90 days ago, a second sum of all ratings in the plurality of reviews for the product generated in the past 90 days; a first count of ratings in the plurality of reviews for the product which were generated more than 90 days ago and a second count of all ratings in the plurality of reviews for the product which were generated in the past 90 days.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore nonlimiting, embodiments illustrated in the drawings, wherein identical reference numerals designate the same components. Note that the features illustrated in the drawings are not necessarily drawn to scale.

FIG. 6 is a depiction of one embodiment of an interface.
FIG. 7 is a depiction of one embodiment of an interface.
FIG. 8 is a depiction of one embodiment of an interface.
FIG. 9 is a depiction of one embodiment of an interface.
FIG. 10A is a depiction of one embodiment of an interface.
FIG. 11D is a depiction of one embodiment of an interface.

DETAILED DESCRIPTION

Figure 1:
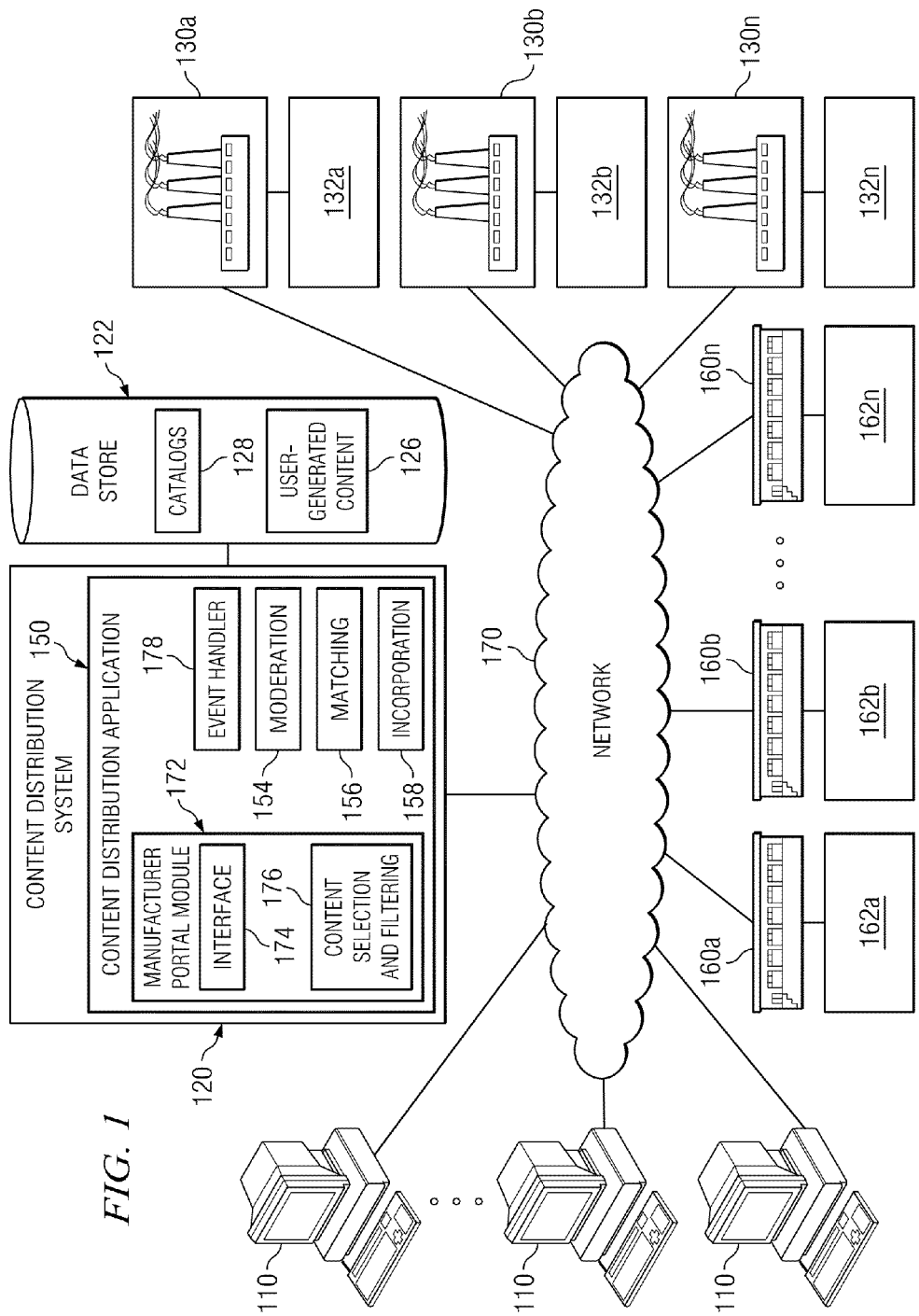
FIG. 1 is a block diagram of one embodiment of an architecture in which a content distribution system may be utilized.

The invention and the various features and advantageous details thereof are explained more fully with reference to the nonlimiting embodiments that are illustrated in the accompanying drawings and detailed in the following description. Descriptions of well known starting materials, processing techniques, components and equipment are omitted so as not to unnecessarily obscure the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this disclosure. Embodiments discussed herein can be implemented in suitable computer-executable instructions that may reside on a computer readable medium (e.g., a HD), hardware circuitry or the like, or any combination.

As used herein, the terms "comprises", "comprising", "includes", "including", "has", "having" or any other variation thereof, are intended to cover a non-exclusive inclusion. For example, a process, article, or apparatus that comprises a list of elements is not necessarily limited only those elements but may include other elements not expressly listed or inherent to such process, process, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example", "for instance", "e.g.", "in one embodiment".

Embodiments of the present invention can be implemented in a computer communicatively coupled to a network (for example, the Internet), another computer, or in a standalone computer. As is known to those skilled in the art, the computer can include a central processing unit ("CPU"), at least one read-only memory ("ROM"), at least one random access memory ("RAM"), at least one hard drive ("HD"), and one or more input/output ("I/O") device(s). The I/O devices can include a keyboard, monitor, printer, electronic pointing device (for example, mouse, trackball, stylist, etc.), or the like. In embodiments of the invention, the computer has access to at least one database over the network.

ROM, RAM, and HD are computer memories for storing computer-executable instructions executable by the CPU or capable of being compiled or interpreted to be executable by the CPU. Within this disclosure, the term "computer readable medium" is not limited to ROM, RAM, and HD and can include any type of data storage medium that can be read by a processor. For example, a computer-readable medium may refer to a data cartridge, a data backup magnetic tape, a floppy diskette, a flash memory drive, an optical data storage drive, a CD-ROM, ROM, RAM, HD, or the like. The processes described herein may be implemented in suitable computer-executable instructions that may reside on a computer readable medium (for example, a disk, CD-ROM, a memory, etc.). Alternatively, the computer-executable instructions may be stored as software code components on a DASD array, magnetic tape, floppy diskette, optical storage device, or other appropriate computer-readable medium or storage device.

In one exemplary embodiment of the invention, the computer-executable instructions may be lines of C++, Java, HTML, or any other programming or scripting code. Other software/hardware/network architectures may be used. For example, the functions of the present invention may be implemented on one computer or shared among two or more computers. In one embodiment, the functions of the present invention may be distributed in the network. Communications between computers implementing embodiments of the invention can be accomplished using any electronic, optical, radio frequency signals, or other suitable methods and tools of communication in compliance with known network protocols.

Additionally, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Before discussing specific embodiments a brief overview of the context of the disclosure may be helpful. As discussed above the generation, distribution and use of user generated content is increasingly important in the modern marketplace. As such it is possible, in many cases, for a user to generate content with respect to a product, brand, category, manufacturer, etc. at the retailer's site, the manufacturer's site or another site altogether. As the presence of this user generated content may drive sales, it is therefore desired to actively promote the generation of such content. This is particularly true with respect to certain types of content which it has proved relatively difficult to obtain.

Thus, it is possible, in many cases, for a user to generate content with respect to a product, brand, manufacturer, etc. at either the retailer's site or the manufacturer's site. As the presence of this user generated content may drive sales, it is therefore desired to actively promote the generation of such content. This is particularly true with respect to certain types of content which it has proved relatively difficult to obtain.

One example of these types of content is what is referred to as question/answer content. This type of content may actually be generated by two (possibly distinct) users, a first user who generates a question to which he wishes to obtain the answer and one or more second users who generate an answer to this question. The question and the corresponding answers may be displayed to users which may help to drive increased sales of a product or increased traffic at a retailers or manufacturer's site.

Another example of this type of content is a review. A review may comprise a body in which the user may be allowed to give, for example, a free form text evaluation of a product, a rating for the product or aspects of the product (four out five stars, 7 out of 10, etc.), pros or cons of the product, tags to be associated with the product or other information. These reviews may be displayed to users in conjunction with a product to aid in a user's purchasing decision with respect to that (or another) product).

In many cases, however, for a variety of reasons users may not be highly motivated to generate a certain type of content. In other words, there may be a participation problem. For example, users may want answers to questions, but do not themselves want to generate answers to other questions. As a consequence it may be difficult to build up a critical mass of user generated content (enough to effect purchasing or other consumer decisions) with respect to any particular one product and it may be apparent to a user at a site that content is lacking.

In the question/answer context, for example, it may be the case that many users have submitted questions but, because "open" questions (i.e. questions which may still have the ability to have an answer provided, regardless of whether one or more answers to the question have already been provided) may be hard to locate, dispersed throughout a site, require very specialized knowledge, etc. very few users have created answers to those questions. Thus, a user may be dissuaded from purchasing a particular product, category of products, or brand because the lack of such content.

In cases such as these it may be desirable for a manufacturer themselves to provide user generated content by answering submitted questions. Additionally, manufacturers may desire to provide user generated content for other reasons, as well. For example, retailers may provide the ability for users to generate questions directly to the manufacturers such that the manufacturers may provide answers to these questions or because manufacturers may desire to answer questions and be identified with the provided answer such that this type of badged answer may serve to dispel misconceptions, correct incorrect information or for a variety of other reasons.

As significant effort and expense has been invested in the gathering and dissemination of such user generated content and this user generated content may have a profound effect on the sales of their products it is highly desired by the manufacturers to have the ability to track the generation of this content, obtain data on the generation of such content or the subject matter of such content, including for example, user perceptions of their products or where their products could be improved, the effect of such content on the sales of their products, or other data related to their products with respect to the retailer sites where such products may be sold and user generated content utilized.

A manufacturer may, however, have a variety of channels where products are sold, making it difficult to gather such data. Similarly, even if the manufacturer is aware of each of the retailers selling its products, each of the retailers may have, for example, a different structure or layout for a site or different identifiers of for the same product. This means that it may be difficult to locate and collect data pertaining to their products or to process such data.

This can lead to undesirable situations where, for example, manufacturers may have little idea of how users view their products, how their products are performing, problems with their products or other data which may be obtained from user generated content, the users who create such content or other data related to the sales of their products or the display and generation of content with respect to their products.

It is therefore desirable to provide an easy way for manufacturers to obtain data regarding their products and user generated content associated with their products. In particular, it may desired to provide analytics tools which may be utilized by a manufacturer to obtain data which may be obtained, or determined, from the user generated content associated with products or the context of such user generated content. Thus, what is desired are systems and methods which can obtain user generated content and associated data across multiple channels and apply analytics to this data to produce structured data which the manufacturer may access to glean insights into various aspects of their products.

Attention is first directed to systems and methods to facilitate the collection and processing of content generated by users. Specifically, in one embodiment, user generated content associated with a particular manufacturer may be aggregated from multiple retailers. This user generated content may be processed to obtain a variety of statistical data associated with the user generated content. This statistical data may be refined according to one or more criteria (also referred to a filters) to allow only statistical data associated with those criteria to be presented.

Certain embodiments may therefore be usefully applied to determine statistical data associated with particular types of user generated content. For example, reviews may be processed to determine statistical data related to the ratings given by users to the manufacturer's products, the frequency of use of words within the review bodies, the geographic location(s) where those reviews were originally generated (e.g. geographic location(s) where the users were located when they generated a review), content codes associated with reviews, certain product categories or product names, or other statistics related to the data associated with reviews. It will be noted however, that though many of the embodiments presented herein may be described with respect to reviews, similar embodiments may also usefully be applied to almost any other type of user generated content.

In one embodiment, an importance metric (referred to also as a "BrandIndex") may be calculated for a set of the manufacturer's products. The importance metric for a product may be calculated by weighting various statistical data associated with that product. This importance metric may be utilized to rank the products of the manufacturer such that statistical, or other, data related to the manufacturer's products (as determined by the importance metric) may be presented to a user in the order of product importance. In other words, statistical data related to the more important products may be presented to a user, or ordered, before statistical data associated with product that are relatively less important or ordered in some other manner based on the order of product importance (least important to most, etc.).

To present such data then, in certain embodiments a manufacturer portal may be provided such that the statistical data may be presented through this portal in a visual, textual, audible, etc. format. The presented data may be associated with one or more products, brands, categories, etc. offered by the manufacturer, or other criteria such as the importance metric, content code, rating, date, etc., such that the presented data may be filtered according to one or more of the associated criteria. The statistical data may be presented graphically in a variety of formats desired by a user. Furthermore, different statistical data may be presented simultaneously through the portal allowing direct comparisons to be made between the two sets of statistical data.

Before delving in more detail into embodiments of the present invention it may be useful to discuss embodiments of systems and methods for distributing user generated content. Certain of these embodiments may be better understood with reference to U.S. patent application Ser. No. 12/243,679 entitled "Method and System for Distribution of User Generated Content" by inventors Bockius et al. filed Oct. 1, 2008, U.S. patent application Ser. No. 12/614,016 entitled "Method and System for Promoting User Generation of Content by inventors Chen et al. filed Nov. 6, 2009, and U.S. patent application Ser. No. 12/698,447 entitled "Method and System for Providing Content Generation Capabilities" by Chen et al. filed Feb. 2, 2010, which are fully incorporated herein by reference. Specifically, embodiments of the present invention may allow content to be generated by a user at a manufacturer's or retailer's (or other) site with respect to an associated product, brand, category, etc. This content may then be distributed to one or more retailers who sell that product such that the user generated content may be incorporated into the retailer's site in conjunction with that product to allow consumers shopping at that retailer to access or view such user generated content.

More particularly, in one embodiment, users may generate and submit content on a manufacturer's or retailer's site using one or more content generation tools incorporated in the retailer's or manufacturer's site. This user generated content may be received at a content distribution system and vetted using a moderation process by which undesired user generated content may be filtered out before the undesired user generated content is incorporated into a retailer's site or the content associated with tags (also referred to as "content codes") which may be descriptive of the user generated content. User generated content associated with a particular product or category may then be distributed to one or more retailers who sell this product or category of product such that this content may be incorporated into the retailer's site in association with that product or category.

The content distribution system, as a central location for user generated content may also analyze the user generated content and associated data to provide manufacturers with statistical data related to the user generated content. This statistical data may include an importance metric for one or more of the manufacturer's products where the importance metric is a measure of the relative importance of the manufacturer's products. Statistical data pertinent to that manufacturer may be distributed to the manufacturers in a variety of ways, including, for example, email, conventional mail, telephone, text messages, etc.

In one embodiment, such statistical data may be presented through a manufacturer portal provided by the content distribution system. By logging into such a portal a manufacturer may be presented with statistical data, where the statistical data may, in one embodiment, be presented according to the importance metric(s) determined for the manufacturer's products. This portal may also provide the manufacturers with the ability to: view statistical data determined based on user generated content related to that manufacturer and to filter this statistical data by, for example, categories of products for sale, brands, types of user generated content (for example, content accepted or rejected for publishing, to view only Reviews, Questions and Answers, Stories, etc. or some combination, etc.), content codes, rating, or other criteria as will be discussed in more detail. Additional functionality related to the statistical data may also be provided, including for example, the ability to compare two sets of statistical data or to distribute links to specific sets of statistical data.

Turning now to FIG. 1, one embodiment of a content distribution topology including one embodiment of a content distribution system is depicted. Manufacturers 130 may produce, wholesale, distribute or otherwise be affiliated with the manufacturer or distribution of one or more products. Retailers 160 may be sales outlets for products made by one or more of manufacturers 130. In fact, in most cases each retailer 160 will sell products from multiple manufacturers 130. These products may be provided for sale in conjunction with one or more websites (referred to as sites) 162 provided by each of retailers 160 such that users at computing devices 110 may access the retailer's site 162 over network 170 (for example, the Internet or another type of communications network) in order to purchase these products or perform other actions.

In addition to offering the ability to purchase these products, retailer's site 162 may offer the ability for a user to access user generated content associated with the products, or categories of products, offered for sale on the retailer's site 162. By accessing such user generated content at the retailer's site 162 a user may be better able to make a purchasing decision with respect to the various products offered for sale on that retailer's site 162 or may be more inclined to buy a product, as the user feels that the product has received positive user generated content (reviews, ratings, questions/answers, etc.) from a critical mass of other users, etc. A user may thus purchase a manufacturer's product from a retailer 160 using retailer's site 162.

Retailer site 162 may also offer the ability for a user to generate content with respect to products offered for sale by retailer 160 or categories of products offered for sale. In other words, a user may utilize the retailer's site 162 to generate user reviews, ratings, comments, problems, issues, question/answers, or almost any other type of content, regarding a product or experience with the product, category, brand, manufacturer or retailer, where this user generated content may be displayed to users accessing retailer's site 162.

It will be apparent, however, that there may be many other ways to purchase or obtain such a product. The product may be offered for sale at many physical stores which may or may not have an online presence (for example, a site), at other retailer's sites 162, the product may be purchased second hand, received as a gift, etc. At some point then the person who obtained this product may desire to provide some sort of feedback on this product and for a variety of reasons, such a purchaser may not have access to, or may not desire to utilize, retailer's site 162 to generate content in association with the obtained product.

To allow these types of people, among other types, to provide user generated content with respect to a particular product, manufacturers 130 may provide manufacturer's sites 132 where these sites, or other means of collecting information from the user, can provide the ability for a user to generate content with respect to the manufacturer's products. In other words, a user may use the manufacturer's site 132 or these other means, to generate user reviews, ratings, comments, problems, issues, question/answers, or almost any other type of content regarding a product, category, brand, manufacturer, etc. usually regardless of where the user purchased the manufacturer's product.

In one embodiment, the user generated content which may be generated at a retailer's site 162 or manufacturer's site 132 may include reviews, stories, ask/answer content or any other type of content in any format which the user wishes to add regarding a product, brand or service (collectively referred to as a product herein), or category of products. Reviews may correspond to a user evaluation of a product and include ratings of product (for example, a number of stars or numerical rating), pros and cons of the product, a descriptive title and a description of a user's experience with a product (referred to as the body of the review), attributes of the user generating the review (for example, demographic information), other product(s) which compliment or may be used with the product being reviewed, pros and cons of the product or any other type of evaluation of a product or aspects of a user's experience with the product. Ask/Answer content may comprise questions or answers submitted by a user, retailer or manufacturer concerning a potential purchase decision, for example regarding the capabilities or use of a product or category of products, demographic information on a user generating a question or answer. Stories may be user generated content which may pertain to open ended experiences with one or more products or categories of products which may be more tangentially related to the product than, for example, reviews.

As the amount of user generated content associated with a product or category at a retailer's site 162 may greatly affect the sale of a product (both at that site 162 and off-line purchases as well), it may be desirable to both manufacturers 130 of a product and retailers 160 who sell that product that any user generated content created in association with a product or category be displayed in conjunction with that product or category on a retailer's site 162 (which may increase revenue for both a retailer 160 and a manufacturer 130 of the product).

Content distribution system 120 may therefore be coupled to network 170 and serve to distribute content generated at both retailer's site 132, manufacturer's site 162, or another location, to retailers' sites 162 which offers these products or categories of products for sale such that the content generated by a user with respect to that product or category at the retailer's site 162 and the manufacturer's site 132 is incorporated into that retailer's sites 162 where the product, or category of product, is offered. Thus, content distribution system 120 allows content generated at a particular retailer's site 162 to be combined with content generated at the manufacturer's site 132 and incorporated into that retailer's site 162 in conjunction with that product, category, brand, etc.

Additionally, as manufacturers 130 may desire to obtain information on their products that are being sold and the content generated by users about these products, content distribution system 120 may analyze the received user generated content or associated data to determine statistical information related to the user generated content or the manufacturer's products. This statistical data may include an importance metric for one or more of the manufacturer's products where the importance metric is a measure of the relative importance of the manufacturer's products. This statistical data may be filtered by, for example, categories of products for sale, brands, types of user generated content (for example, accepted or rejected for publishing), content codes, date ranges, retailer site, keyword, rating level, or other criteria such that the statistical data presented is calculated based on user generated content associated with that filter. A manufacturer may thus be presented with statistical data related to user generated content associated with that manufacturer or manufacturer's products which was generated at any of retailer's sites 162 or manufacturer's sites 132 and which may be associated with particular criteria as specified by the manufacturer.

By centralizing the distribution, incorporation and analysis of this user generated content a number of technical advantages may be achieved, especially with regards to the processing (including analysis), storage and distribution of such user generated content, including the moderation of such user generated content and the formatting of such user generated content for incorporation in the sites 162 of retailers 160.

Additionally, this centralization may allow for easier correlation of user generated content with manufacturers, products or categories; statistical analysis of such user generated content and the presentation of such statistical data to the manufacturers.

Furthermore, such a centralized content distribution system may have a number of business advantages. For example, as the sale of their products is important to retailer's 160 and manufacturers 130, both manufacturers 130 and retailers 160 may pay operators of content distribution system 120 for formatting or distributing the user generated content to the retailer's sites 162 and manufacturers 130 may pay to for the statistical data which may be generated from an analysis of this user generated content.

Content distribution system 120 will now be discussed in more detail. Content distribution system 120 may include one or more computers communicatively coupled to a network 170 and a data store 122. Data store 122 may comprise user generated content 126 and catalogs 128. User generated content 126 may be associated with one or more products or categories, where this user generated content may have been generated at manufacturer's site 132, retailer's site 162 or at another location altogether. Catalogs 128 may comprise a set of catalogs, each catalog corresponding to a retailer 160 or manufacturer 130. A catalog may comprise a set of category identifiers utilized by the retailer or manufacturer, where each category identifier may be associated with one or more product identifiers and each product identifier may be, in turn, associated with a brand name, a product name, or any number of other desired attributes. A catalog may, for example, comprise one or more files of eXtensible Markup Language (XML). These catalogs 128 may be received from retailer 160 or manufacturer 130, for example over network 170, at a regular or semi-regular basis. For example, catalogs may be received nightly from retailer 160 or manufacturer 130. It will be apparent that each retailer or manufacturer may provide their catalogs at different times, according to different time periods or schedules, irregularly, etc.

Catalogs 128 may also comprise one or more catalogs generated from catalogs received from retailers 160 or manufacturers 130. For example, in one embodiment a global catalog associated with each manufacturer may be created by consolidating portions associated with that manufacturer of each catalog received from retailers 160 with any catalogs received from the manufacturer 130. A global catalog may, for example, comprise a set of global categories and associated global products identifiers where product identifiers and category identifiers used by the retailers for corresponding categories and products may be associated with these global identifiers.

In one embodiment, a global identifier may be associated with item information from each of a set of matched items consolidated from each of the retailer or manufacturer catalogs. As an item is added to the global catalog or an item's information is updated, the name of the category from each retailer may be added as a 'tag' associated with the global identifier for the item. An item can have multiple category tags. An interface may be is provided for administrators to add, combine and rename category tags. For example, a product could be in the "LCD Monitors" category in one retailer and "19 inch Monitors" for another retailer. This item would get added under both categories in the global cataglog. A user, could, if desired choose to consolidate these two categories into, for example, a "Monitors" category.

Content distribution system 120 may also include a content distribution application 150 which comprises a statistical information processing module 172, a moderation module 154, a matching module 156 an event handler module 178 and an incorporation module 158. Moderation module 154 may moderate (for example, filter or otherwise select), or allow to be moderated, content which is, or is not to be, excluded or included, while matching module 156 may serve to match received user generated content with a particular product or category. In one embodiment, this matching process may be accomplished using catalogs 128.

Incorporation module 158 may be configured to incorporate a tool for the generation of content into a manufacturer's portal, or a retailer's or manufacturer's site. Furthermore, incorporation module 158 may incorporate user generated content into a retailer's site 162, or other site, for display to a user. In particular, a user may generate content regarding a product or category at manufacturer's site 132 or retailer's site 162 using a content generation tool (for example, a GUI, webpage, widget, etc.) presented on the site. This tool may be implemented or developed by operators of content distribution system 120 and provided for use with a site to facilitate the generation of content by users, or the subsequent processing, distribution and incorporation of such content by content distribution system 120. These tools may be hosted by incorporation module 158 of content distribution system 120. Thus, for example, on a page of retailer's site 162 a content generation tool may be included, such that the tool hosted at content distribution system 120 may be incorporated in the site 162 for use by a user at the site 162.

Such content generation tools can be distributed throughout a retailer's or manufacturer's site. For example, these content generation tools may be included on a site's product pages as well as the category pages which help to organize the product page. Thus, such a content generation tool may be advantageously employed to allow content to be generated in the context of the product catalog page or category page on which it was deployed. So, for example, a module that is deployed on a television product page will receive reviews associated with that television product that may be different than the review of a wool sweater received on a module deployed on the product page for the wool sweater.

In any event, the content generated by the user with respect to a product or category may be received by content distribution system 120 and stored in association with a product or category. The received content may be moderated by moderation module 154, to determine if such content should be utilized for display on a site, or may be edited for suitability. This moderation process may comprise different levels of moderation, including auto processing the user generated content to identify blacklisted users or trusted users; human moderation which may include manually classifying content or content recategorization; proofreading; or almost any other type of moderation desired. Note, however, that such moderation may or may not be employed in certain embodiments. For example, content from certain manufacturers may not undergo such a moderation process, or may undergo moderation at a different point.

In one embodiment, this moderation process may also comprise associating tags with the received user generated content. These tags may comprise content codes which pertain to the received user generated content as will be discussed in more detail at a later point. The user generated content may also be associated with a manufacturer, products or categories of products offered for sale by retailer 160 or the manufacturer 130, a user attributes of the user who generated the content, product attributes, etc., by, in one embodiment, associating the user generated content with a product identifier for a product, or a category identifier for a category, and storing the content and the determined associations in data store 122.

At least a portion of these associations may be determined using matching module 156 which may compare data received in conjunction with the user generated content (for example, product data, category data, user data, etc.) with data in a catalog 128. Once it is decided that the user generated content is to be stored in data store 122 and allowed to be disseminated (for example, has been moderated), event handler 178 may take certain actions based on the user generated content or its associated data, such as emailing a user, sending alerts to a manufacturer that new content regarding one of their products has been received, etc. These events may be tailored to the type of content generated or other attributes of the content.

Accordingly, a user shopping at, for example, retailer's site 162 may access a web page or other portion of the site 162 corresponding to a particular product or category. User generated content 126 associated with that product or category may be displayed such that a user viewing a portion of the retailer's site associated with a particular product or category may have user generated content 126 associated with that product or category displayed to him. This user generated content, may, for example, have been generated at the retailer's site 162, through the manufacturer's site 132 or at another site. Thus, the display of this user generated content to the user while he is shopping, may, in turn, motivate the user to make a purchase through retailer's site 162.

Both the user generated content and a content generation tool may be provided in conjunction with one another on the retailer's site 162. Specifically, in one embodiment, the content from content distribution system 120 and a content generation tool may be incorporated into a portion of a web page of retailer's site 162 using an iframe or div tag (or another type of HTML element or tag, or another type of mechanism). This mechanism works in conjunction with a software module associated with content distribution system 120 (such as JavaScript or other set of computer readable instructions) included on the web page or at the retailer's site 162. The software module may make calls back to the incorporation module 158 on content distribution system 120 to incorporate the desired content for that page along with a content generation tool.

More particularly, in one embodiment, when a web page is loaded at retailer's site 162 the HTML for the page may load, followed by a loading of the iframe (which may be hidden), div, table, or other mechanism which is used to incorporate content from the content provider system 120. The software module provided by the content distribution system 120 may also load at this time to access incorporation module 158 to obtain data (e.g. reviews, stories, etc., as discussed above) for inclusion in the web page in conjunction with the mechanism (div, HTML or other element) for display of the provided content.

In one embodiment, the software module associated with content provider system 120 resident on retailer's site 162 (for example, JavaScript or other computer instructions) may be executed when the web page is loaded. This program may send data such as the product data, user data, display codes, etc. to incorporation module 158. Incorporation module 158 may utilize this data to determine user generated content 126 to return and format this data accordingly. The software module on the retailer's site 162 receives content from the incorporation module 158 and copies the content into the element on the web page configured to display the content. Moreover, the ability to generate additional content may be offered, where the type of content generation opportunity offered may correspond to the type of incorporated content. For example, the opportunity to generate an additional review may be presented along with reviews that have been incorporated in the web page at the retailer's site.

It will be noted at this point that while embodiments discussed herein may be described with respect to the generation of content at one or more retailer's or manufacture's sites, the processing of such user generated content or associated data to determine statistical information and the integration of the user generated content into the retailer's site utilizing a content distribution system, it should be understood that other embodiments may be effectively utilized to analyze user generated content at other locations and such embodiments may be effectively utilized to analyze such user generated content or associated data regardless of the where such data is collected or stored. As such, embodiments may be utilized where the generation of content occurs at a first location, the incorporation of content occurs at a second location and the analysis of such user generated content occurs at a third location, where the first, second and third location may each be distinct from, or the same as, one or more of the other sites.

The analysis of user generated content and associated data will now be discussed in more detail. As discussed statistical information processing module 172 may analyze the user generated content and associated data related to a manufacturer to provide that manufacturer with statistical data related to that user generated content. This statistical data may include an importance metric for one or more of the manufacturer's products where the importance metric is a measure of the relative importance of the manufacturer's products. This statistical data may be determined according to a number of criteria such that the user generated content and associated data analyzed may be associated with those criteria and thus resulting statistical data may also be associated with those criteria. More particularly, in certain embodiments statistical data may be determined using user generated content associated with such criteria such that the same statistical data may be determined utilizing different groups of user generated content, each of the groups associated with one or more of the criteria.

Figure 2:
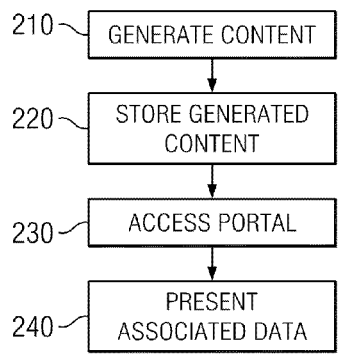
FIG. 2 is a flow diagram of a method for processing user generated content.

Moving now to FIG. 2, a flow diagram for one embodiment of a method of providing statistical data associated with user generated content is depicted. At step 210 users may generate content with respect to one or more products produced or provided by a manufacturer at a retailers site 162 or at the manufacturer's site 132. As discussed above, in one embodiment, this content may be reviews. Reviews may correspond to a user evaluation of a product and include ratings of product (for example, a number of stars or numerical rating), pros and cons of the product, a descriptive title and a description of a user's experience with a product (referred to as the body of the review), attributes of the user generating the review (for example, demographic information), other product(s) which compliment or may be used with the product being reviewed, pros and cons of the product or any other type of evaluation of a product or aspects of a user's experience with the product.

The generated content may be received and stored at the content distribution system at step 220. More specifically, the user generated content may be received at the content distribution system along with a product identifier or category identifier corresponding to a product or category associated the generation of the content. For example, if a user utilized a content generation tool presented on a product page the user generated content may be received along with a product identifier or category identifier associated with that product. Additionally, in one embodiment, the user generated content may be received along with a location where the user generated the content or data from which such a location can be identified (such as an IP address or the like).

Thus the user generated content may be associated with other data by matching the received product identifiers or category identifiers with the product or category identifiers of one or more catalogs. In one embodiment, this matching process may comprise utilizing the received product or category identifier to search one or more global catalogs to determine a global product identifier or global category identifier to associate with the user generated content.

More specifically, the user generated content may be stored in association with a retailer identifier associated with the retailer where the content was generated, a brand or manufacturer identifier, a product identifier associated with the manufacturer or retailer or a global product identifier, a category identifier associated with a category utilized by the manufacturer or retailer or a global category identifier, attributes of the user who generated the content, attributes of the product associated with the user generated content, a location or location identifier, or other desired data which may be provided in a communication from the site at which the content was generated or determined at the content distribution system.

The user generated content may also be moderated, to determine if such content should be utilized for display on a site, or edited for suitability. This moderation process may also comprise associating tags with the received user generated content. These tags may comprise content codes which pertain to the received user generated content. For example, these content codes may comprise "product defect" where the user generated content is describing or indicates a defect or flaw in an associated product; "product enhancement" where the user generated content indicates a way in which the associated product may be made better; "negative" where the user generated content indicates a unfavorable sentiment associated with the product; "positive" where the user generated contend indicates a favorable sentiment about the associated product; "approved by client" where the user generated content has been approved for inclusion by a retailer, manufacturer or other operator of a site where user generated content may be incorporated; "competitor reference" where user generated content pertaining to one product may reference a different product or manufacturer; "customer service complaint" where the user generated content comprises a complaint of service(s) related to a product or manufacturer; "inappropriate or unrelated" where the user generated content is deemed to be unrelated to the product or category for which it was submitted or otherwise unrelated; "issue prevented purchase" where the user generated content indicates that something prevented a user's purchase of the product; "mfr. issue or pricing complaint" where the user generated content indicates a complaint about a manufacturer or the price of a product; etc. These tags and associated meanings are exemplary only and other or different tags may also be utilized.

Using received user generated content then, at step 230 an importance metric may be determined for one or more of the manufacturer's products where the importance metric is a measure of the relative importance of the manufacturer's products. In one embodiment, this importance metric may be determined by counting the user generated content, for example by determining a volume of user generated by determining the number of questions, number of answers provided, both the number of questions asked and the number of answers provided, the number or reviews generated, etc.

In one embodiment this importance metric is a weighted rating for a product based on reviews associated with the product with newer reviews being weighted higher than older reviews and is calculated as follows:

RO—Sum of all ratings in reviews for the product generated more than 90 days ago.

RN—Sum of all ratings in reviews for the product generated in the past 90 days.

CO—Count of ratings in reviews for the product generated more than 90 days ago.

CN—Count of all ratings in reviews for the product generated in the past 90 days.

$$\text{Importance Metric} = (RO/2 + RN + 6)/(CO/2 + CN + 2) * 200 \quad [\text{EQ. 1}]$$

Statistical data corresponding to the manufacturer may then be determined at step 240. In particular, in one embodiment, one or more criteria may be received. These criteria may be default criteria or may be provided by a manufacture themselves, for example, through interaction with an interface being utilized by a user associated with manufacturer to access such statistical data as will be discussed in more detail below. These criteria may include the manufacturer itself, a type of user generated content that all user generated content of that type may be used (for example, all reviews), a source (for example, particular retailer), a category, a product, a date range, a content code, a keyword, a rating level (for example, 5 stars, 1 star, etc.).

User generated content associated with these criteria may then be obtained. For example, if the criteria is a manufacturer all user generated content corresponding to that manufacturer may be used or all user generated content of a particular type corresponding to the manufacturer may be obtained. If the criteria is a particular product all (or a particular type of) user generated content such as reviews associated with that product may be obtained by searching in a data store for stored user generated content associated with that product. Similarly, if the criteria is a particular keyword user generated content (or a particular type of) user generated content such as reviews which contain that keyword may be obtained by searching in a data store for stored user generated content associated with that product. In substantially the same manner, user generated content (and stored data associated with that user generated content as discussed above) may be obtained based on one or more desired criteria.

The obtained user generated content may then be processed to determine statistical data related to that user generated content. For example, in one embodiment one or more of the following statistics may be computed utilizing obtained reviews associated with one or more criteria: average rating over time and average rating over time per retailer (for example, sum of ratings/total number of ratings split over time periods (for example, month, week, days, etc.)); volume of user generated content over time (for example, the number of reviews generated in a time period); volume over time per retailer (for example, the number of reviews generated at a particular retailer in a time period); number of reviews per rating level (for example, a count of ratings split per rating level (for example, number, stars, etc.)); number of reviews per retailer (for example, a count of ratings split per retailer); average rating per retailer (for example the sum of ratings/total number of ratings split per retailer); highest rated products and lowest rated products (for example, the top/bottom products based on importance metric calculation above); fastest rising based on rating and fastest dropping based on rating (for example, the average rating today minus average rating 90 days ago (if rating existed 90 days ago) to allow sorting by rating with a secondary sort on volume for highest and lowest)); fastest rising based on volume and fastest dropping based on volume (for example, the total number of reviews today minus total reviews 90 days ago (if rating existed)) to allow sorting by rating with a secondary sort on volume for highest and lowest); largest retailer gap (for example, average rating split by product and retailer where for each product the rating for each retailer is subtracted from the ratings of the other retailers and keep the largest number as the 'gap' and sort by this number for the products with the largest rating different between retailer); common words in reviews (for example by counting all words in all reviews minus a set of "stopwords" that don't add any value to the content where words in the titles are worth more than words in the bodies of the reviews; positive words in reviews (for example, by counting the words in higher rating reviews (for example 4 or 5 star reviews) and count the words in lower rating reviews (for example, 1-3 star reviews), for each word subtract the number of times it shows up in negative reviews from the times that it shows up in positive reviews and sort by the remaining word counts to find words that generally only show up in positive reviews); negative words in reviews (for example, by performing the same calculation as for positive words in reviews except subtract the positive words from the negative words to find words that show up only in negative reviews). Other methods of calculating such statistical data and other types of statistical data are also contemplated by embodiments as disclosed herein.

Determined statistical data may then be presented to the manufacturer at step 250. While the statistical data may be presented to a user associated with a manufacturer in a variety of manners, including non-electronic means such as via mail, printed charts or graphs or other nonelectronic methods or electronic means including email or the like, it will be realized that an effective means of presenting such statistical data and interacting with a manufacturer to obtain criteria or the like may be highly desirable. Accordingly, then, in one embodiment, a content distribution system may provide a manufacturer portal whereby a manufacture may utilize such a portal to access desired statistical information and provide criteria such that desired statistical information may be determined and presented through the portal. Embodiments of such a manufacturer portal may be better understood with reference to "Method and System for Providing Content Generation Capabilities" by Chen et al. filed Feb. 2, 2010 as U.S. patent application Ser. No. 12/698,447, fully incorporated herein by reference.

Figure 3:
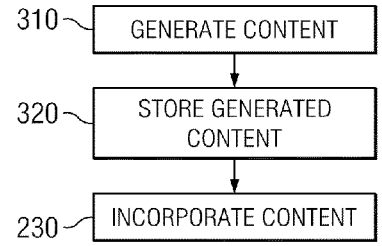
FIG. 3 is a block diagram of one embodiment of an architecture in which a content distribution system may be utilized.

Moving now to FIG. 3 an embodiment of a content distribution topology which includes a content distribution system which provides a manufacturer portal is depicted. As certain aspects of the content distribution topology are similar to those discussed with respect to FIG. 1 they will not be elaborated on in the discussion of FIG. 1.

More particularly, as manufacturers 130 may desire to view statistical information generated with respect to their products or brands, content distribution system 220 may provide a manufacturer portal accessible by a manufacturer 130 across network 170. By accessing this portal a manufacturer may be presented with statistical data associated with user generated content pertinent to that manufacturer which was generated at any of retailer's sites 162 or manufacturer's sites 132. The manufacturer may provide criteria through this portal such that the statistical data associated with the manufacturer may be filtered by the manufacturer according to a variety of criteria, such as product, brand, category, retailer, type of user generated content, statistic type, etc. (as discussed above) such that desired statistical data may be presented.

Thus, content distribution system 220 may comprise a manufacturer portal module 172 which comprises an interface 174 which may be one or more web pages or other type of interface such a graphical user interface (GUI) (which may accessed over network 170) allowing a user such as a marketing director affiliated with a manufacturer 130 to obtain statistical data pertinent to that manufacturer. This interface 174, may for example, obtain criteria from a user to provide to statistical information processing module 172 such that statistical data may be determined by statistical information processing module 172 based on that criteria using user generated content associated with both that manufacturer and that criteria. The resulting statistical data may then be provided to the user through the interface 174 of the manufacturer portal.

It will be useful to both an understanding of the types of statistical data which may be determined in certain embodiments and the use of embodiments of a manufacturer portal in conjunction with the determination and presentation of this statistical data to elaborate on embodiments of interfaces 174 which may be utilized by the manufacturer portal module to interact with a user.

Figure 4:
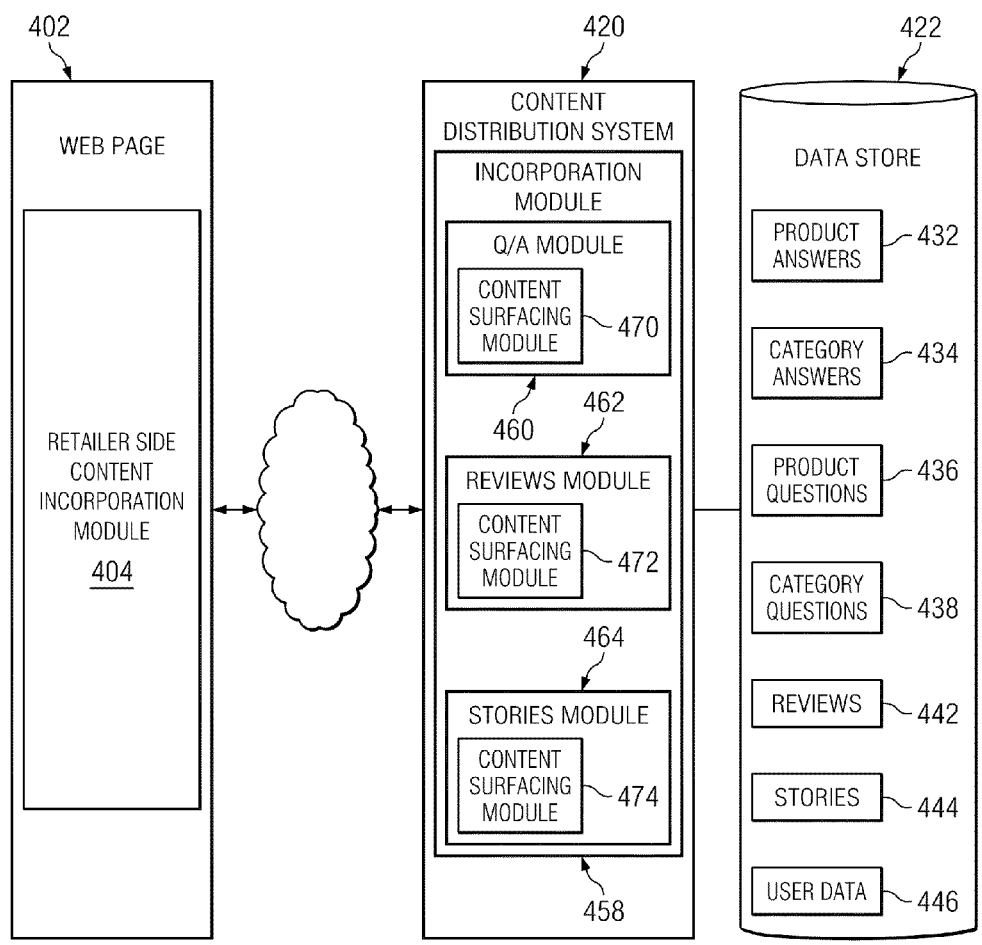
FIGS. 4A and 4B are depictions of one embodiment of an interface.
Figure 5A:
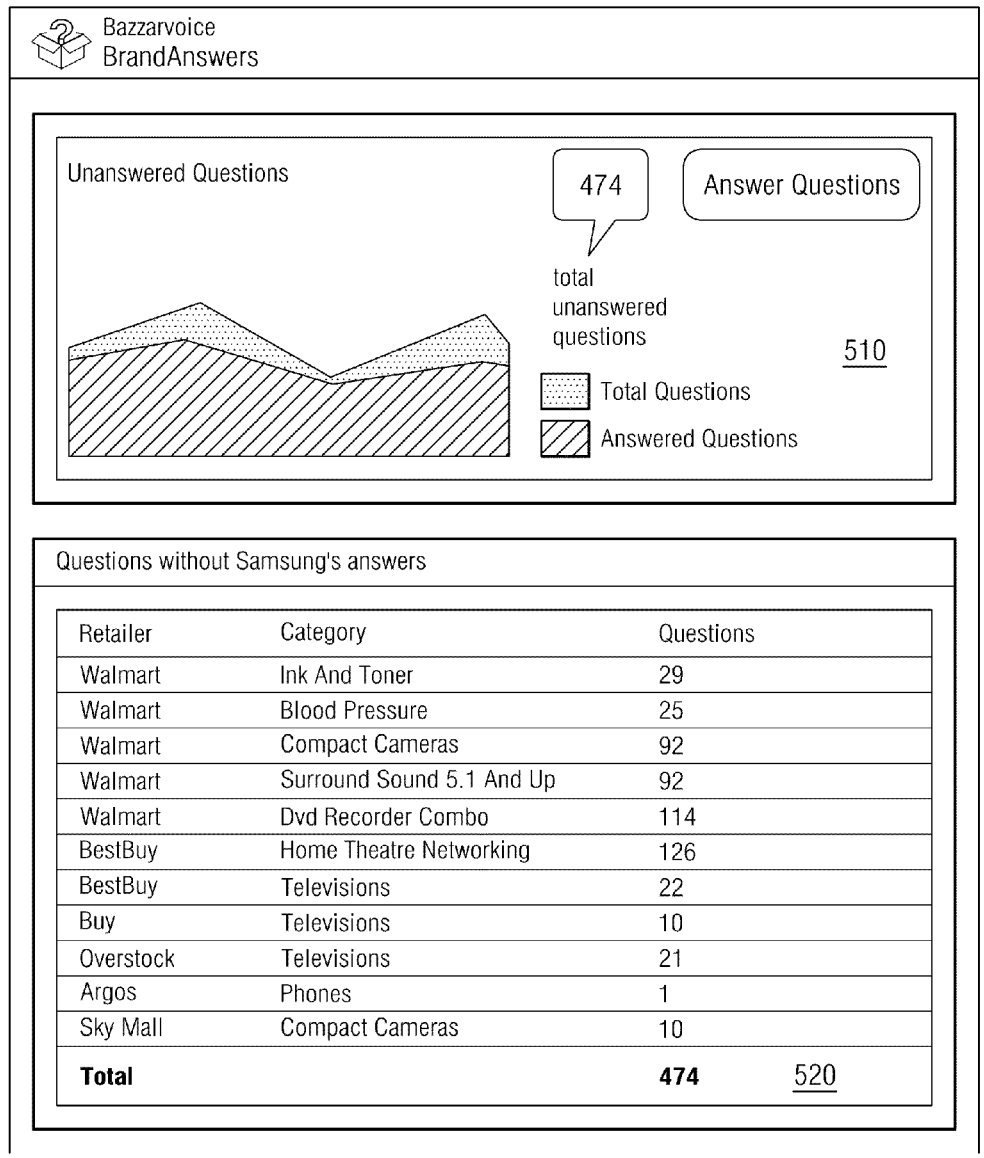
FIG. 5 is a depiction of one embodiment of an interface.
Figure 5B:
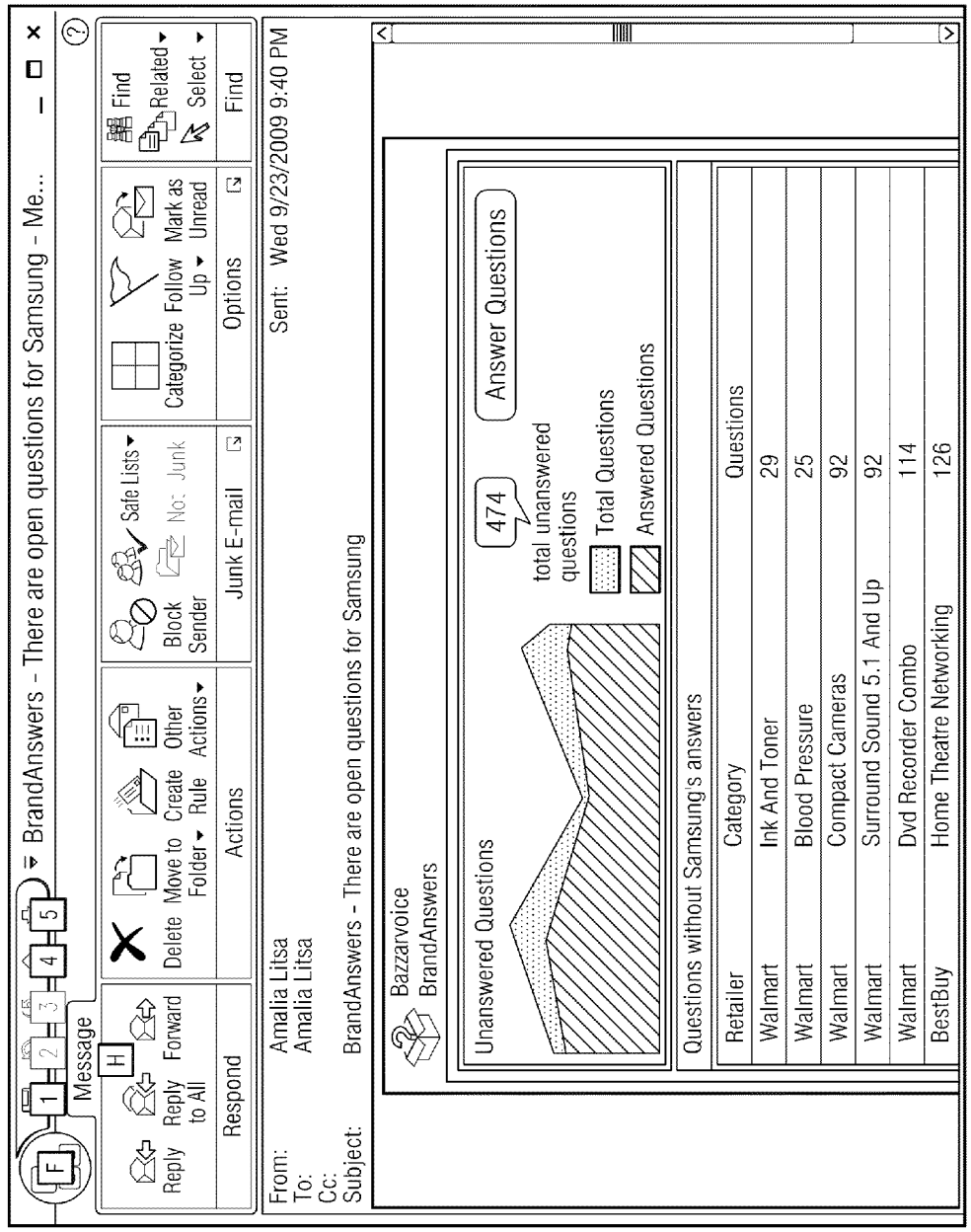
Figure 5C:
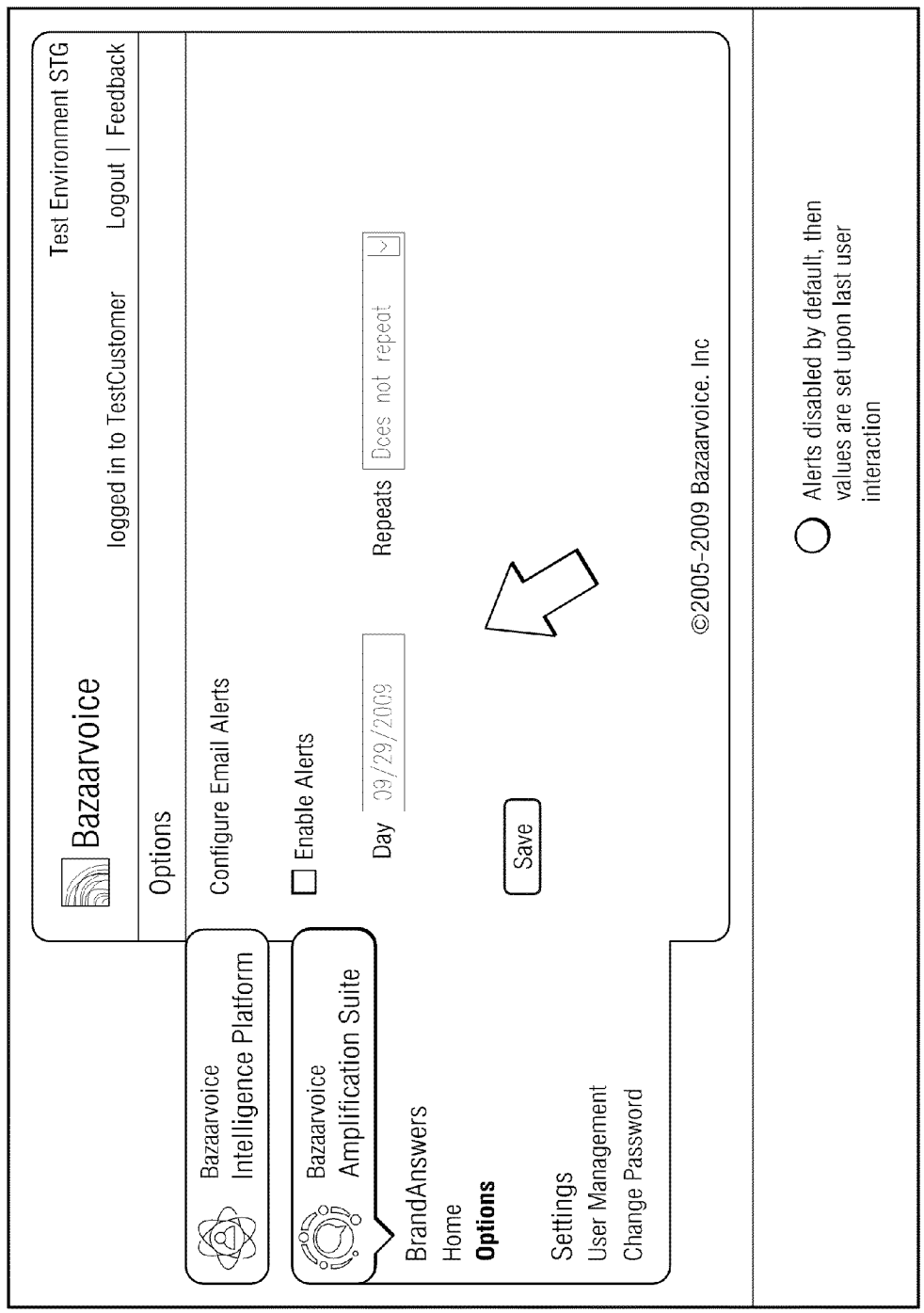
Figure 5D:
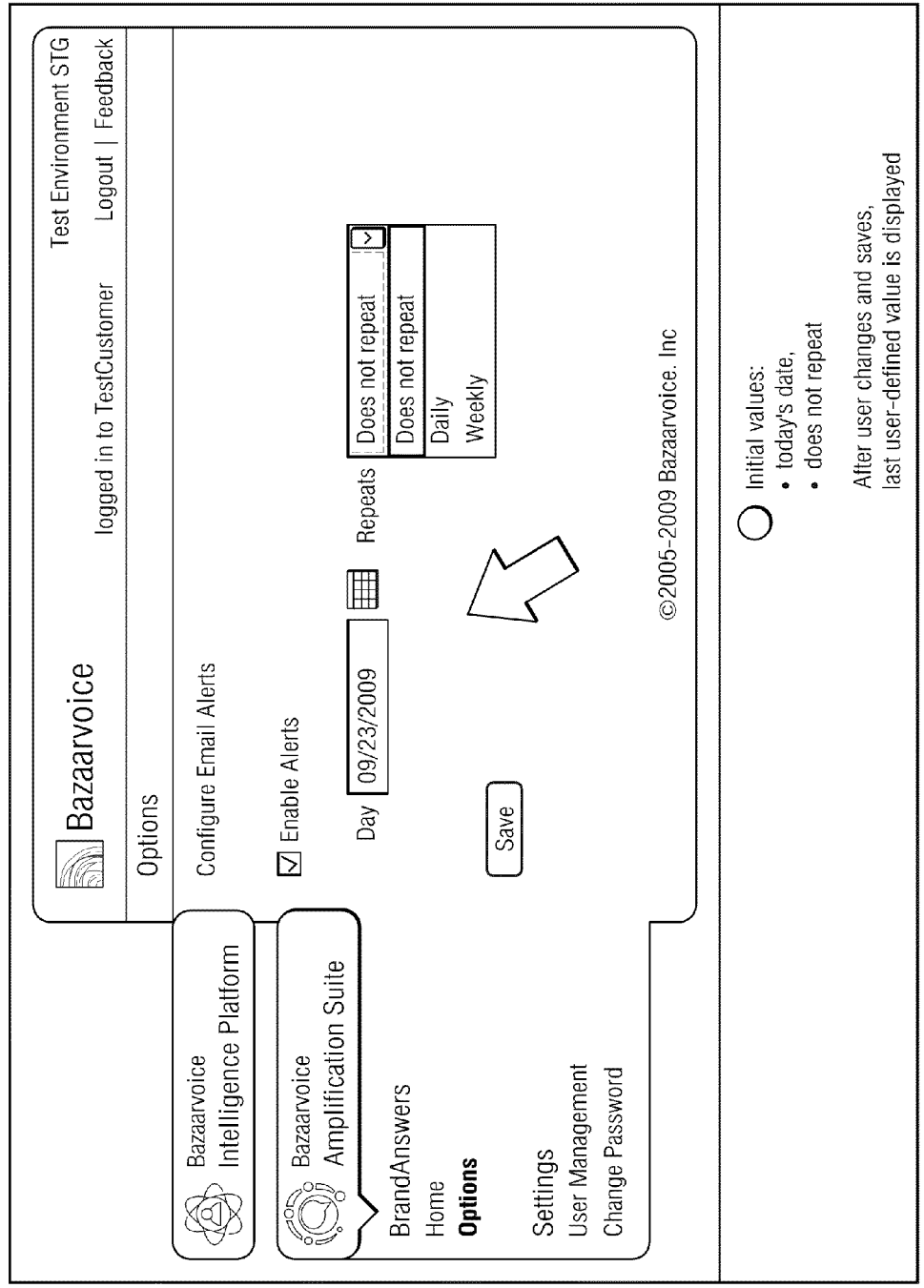

With that in mind, attention is now directed first to FIGS. 4A and 4B which depict one embodiment on an interface that may be presented to a user when the user logs into a manufacturer portal or access a particular location within the manufacturer portal pertaining to statistical data. Note with respect to this interface that area 410 may allow selection of criteria which may be used to determine or present statistical data such as "Rating," "Date" ranges, a search term, "Retailer," "Category," etc. An overview area 412 may present statistical information associated with all of a type of user generated content associated with a manufacturer (for example, reviews) and area 414 may present a graph representing statistical data associated with the distribution of reviews by ratings. Area 416 may present statistical data pertaining to user generated reviews according to a time period and allow a user to select the criteria of time period to change the time period or allow the statistical data to be filtered by retailer rating or retailer volume. Other areas of the interface may present statistical data associated with average rating of the manufacturer's products according to retailer from highest to lowest as a bar graph, the number of reviews generated at each retailer as a pie chart, a list of the manufacturer's highest rated products (according to, for example, a calculated importance metric as discussed above); a list of lowest rated products; fastest rising (according to a change in the importance metric of each product over a time period); fastest dropping; fastest rising (according to the amount of user generated content in a time period); fastest dropping according to volume and a retailer gap which indicates the difference in volume or rating of user generated content at various retailer's or other site (which may include the manufacturer). It will be noted that the products, categories, retailers, etc. may be links such that by interacting with such links further data may be presented on such a product, category, retailer, etc.

For example, a user may click on the "Products" tab 420 of the interface to be presented with an interface comprising data pertaining to that manufacturer's products. FIG. 5 depicts one embodiment of just such an interface. Here, a list of products may be presented where the list of products is ordered by an associated importance metric (for example, highest importance metric displayed first). Additionally, associated with each of the displayed products may be the change in the product's ratings over a time period, the average rating of the product, the number of reviews which have been generated about the product and the importance metric (here referred to as the "BV Index"). Area 530 may allow selection of criteria which may be used to determine or present statistical data including filtering the products presented or the order in which they are presented.

Each of the presented products may comprise a link such that by interacting with such links further data may be presented on such a product, category, retailer, etc. FIG. 6 depicts one embodiment of an interface which may be presented to a user when a link associated with a product is clicked. Such an interface may comprise a depiction of the average rating, the number of reviews generated about the product, the volume of ratings by rating level and an indication of the most frequent words utilized in both positive and negative reviews.

Referring briefly back to FIG. 4A, a user may also click on the "Reviews" tab 422 of the interface to be presented with an interface comprising data pertaining to reviews on that manufacturer's products. FIG. 7 depicts one embodiment of an interface used to present reviews to a user. Here the test of the reviews may be presented, where the reviews may be presented according to a variety of criteria, including most recently generated, by product, reviews pertinent to most important product first, by retailer site at which the review was generated, or a wide variety of other criteria.

Figure 8A:
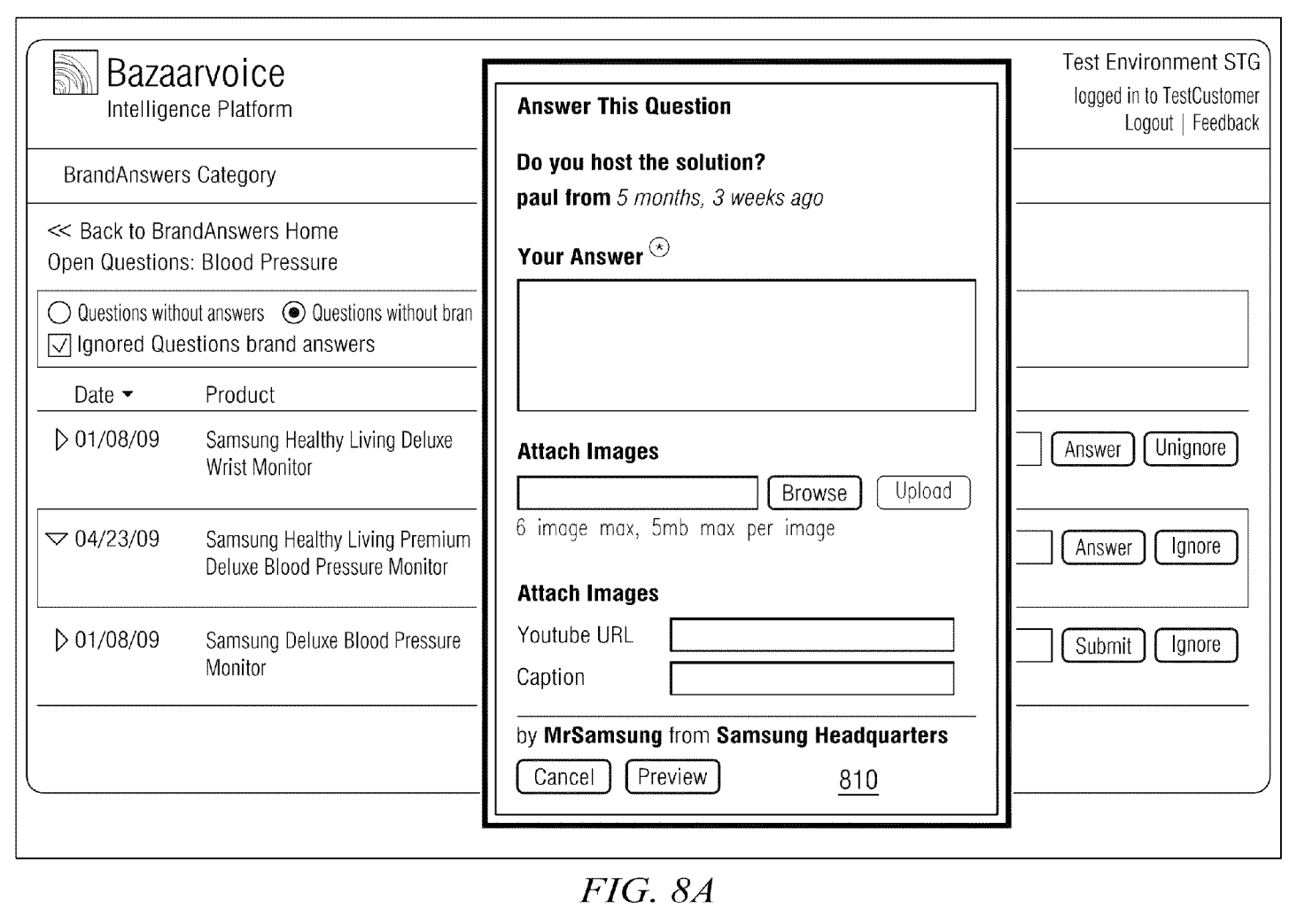
Figure 8C:
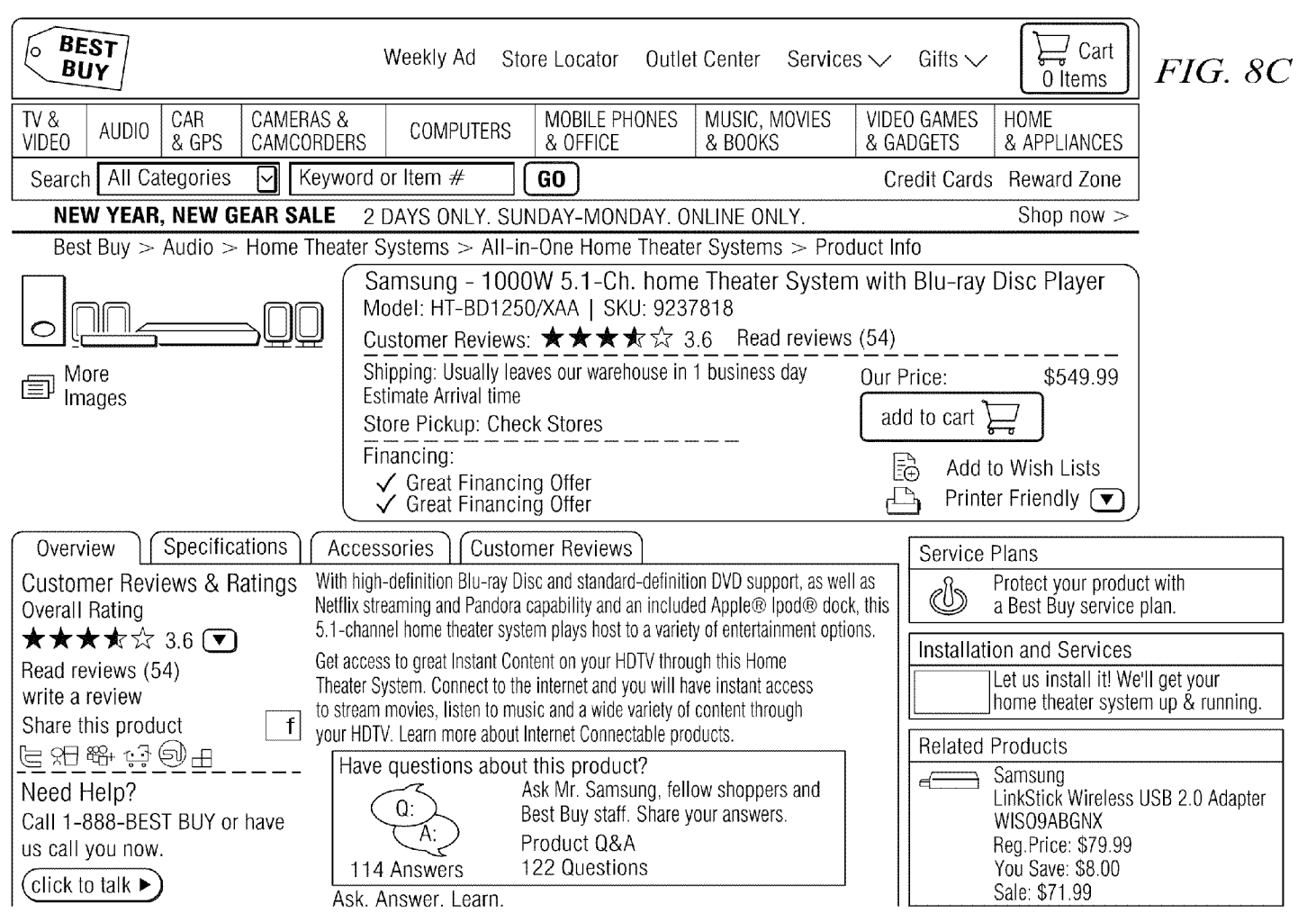

Moving to FIG. 8, by interacting with such an interface data on common words utilized in such reviews may be presented. Here, when a user interacts with the "Common Words" area 810 of the interface, area 820 may present the most common words which have been utilized in the generated reviews, where an indication of the relative popularity of such words (such as different fonts, sizes, colors, weights, etc.) may be provided. By interacting with the words as presented in area 820 the user may be able to filter the reviews presented by a selected words.

FIG. 9 depicts one embodiment of an interface which presents user reviews filtered by a selected word. Here, the reviews are filtered and presented according to the criteria of the product "HP Mini Netbook with Intel", the retailer "Best Buy" and the word "week". By interacting with the "Share Report with Current Filter" area 910 a user may create a report to be presented to another user. This creation of this report may create a link for the other user such that user may access this information (for example, the reviews for the manufacturer filtered by the criteria of the criteria of the product "HP Mini Netbook with Intel", the retailer "Best Buy" and the word "week"). The created link may be an active link such that any data obtained or determined between the time the report is created by the initial user and provided to the second user, and the time the second user accesses the report, will be incorporated into the report at the time the second user accesses the report.

Figure 10A:
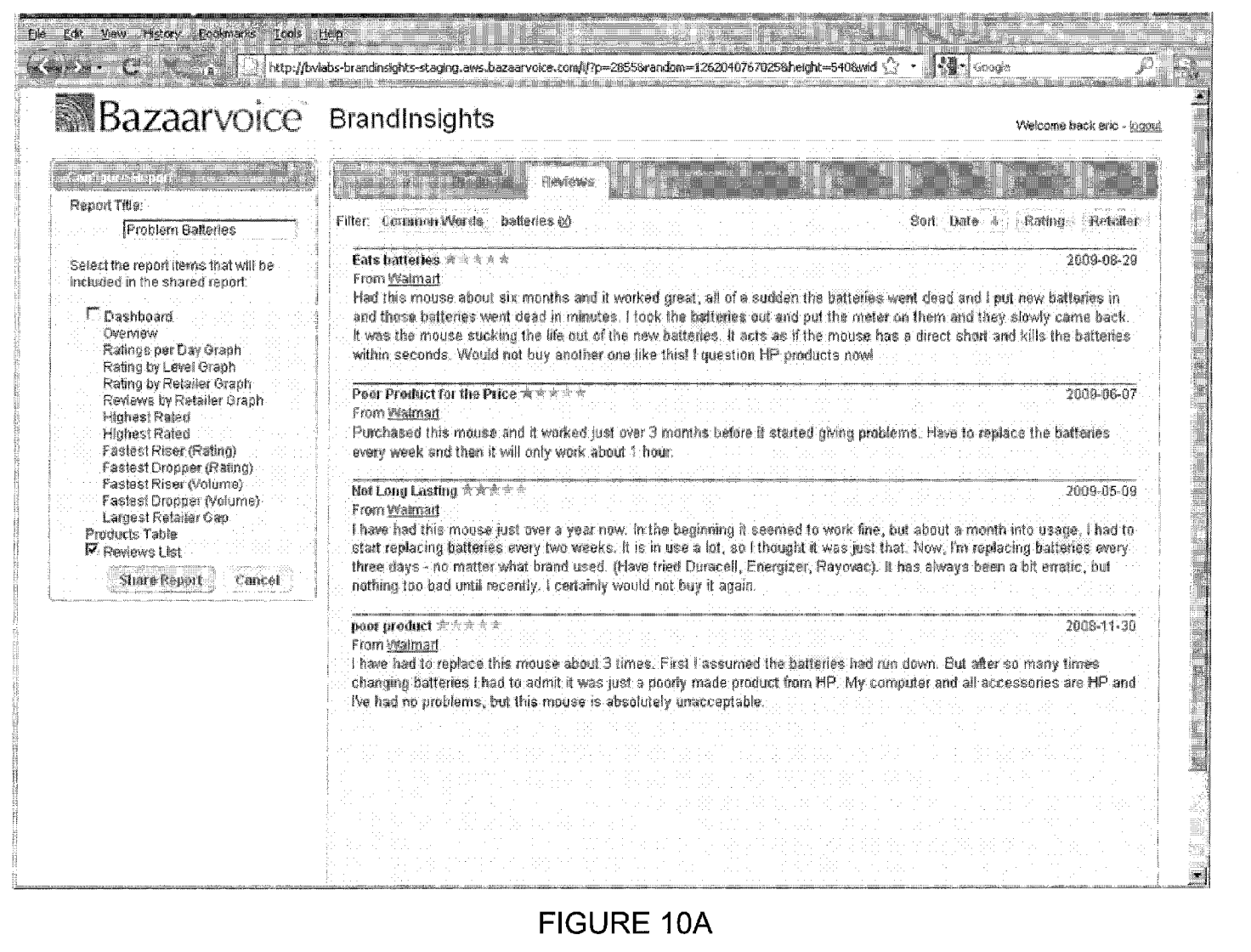
Figure 10B:
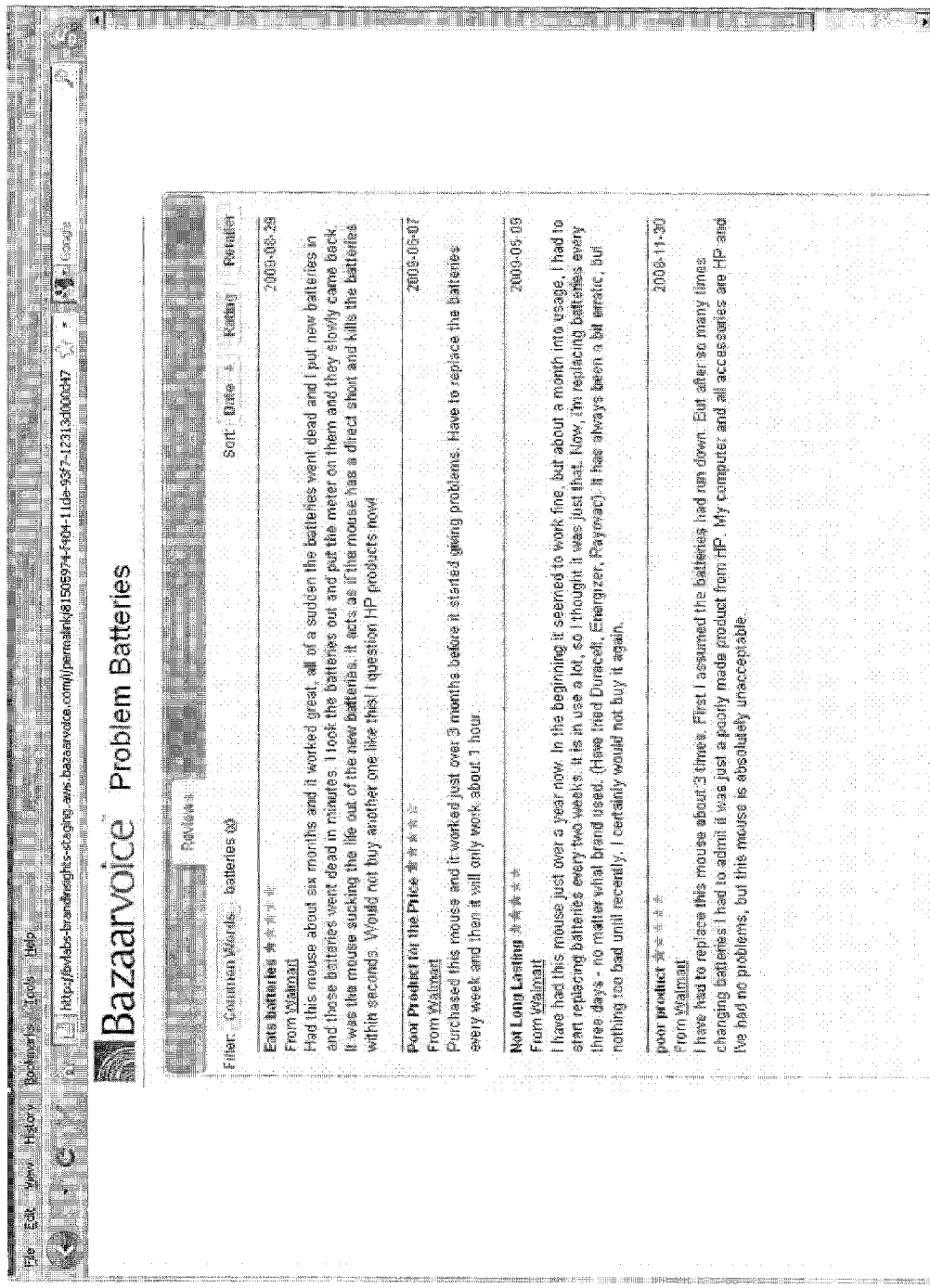
FIG. 10B is a depiction of one embodiment of an interface.

FIG. 10A depicts one embodiment of an interface which may be utilized to create such a report and customize the report to the creating user's desires, allowing the creating user to title the report and select the data which will be available to a user to which the report will be provided. FIG. 10B depicts one embodiment of an interface which is utilized to present such a report when the report is accessed by such a user.

Figure 11A:
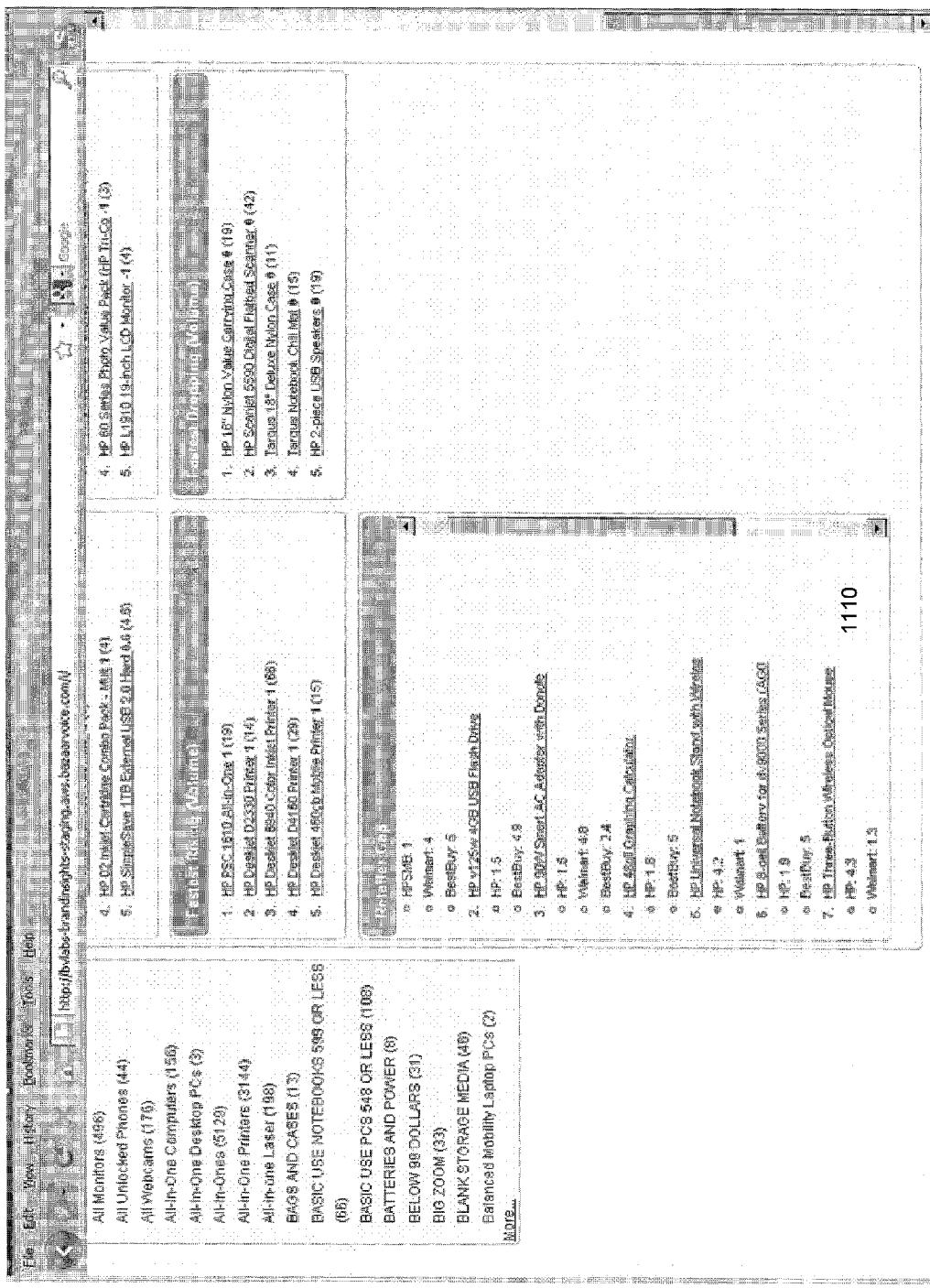
FIG. 11A is a depiction of one embodiment of an interface.

It may now be useful to step through a hypothetical use case with respect to embodiments of interfaces which may be utilized by embodiments of a manufacturer portal provided by a content distribution system. To aid in the description of such a scenario attention is directed to FIGS. 11A-11D which depict embodiments of these types of interfaces. Referring first to FIG. 11A a user may login to the manufacturer's portal and after reviewing the "Retailer Gap" area 1110 of the manufacturer portal select a product presented therein, in this case the "HP Three-Button Wireless Optical Mouse."

Figure 11B:
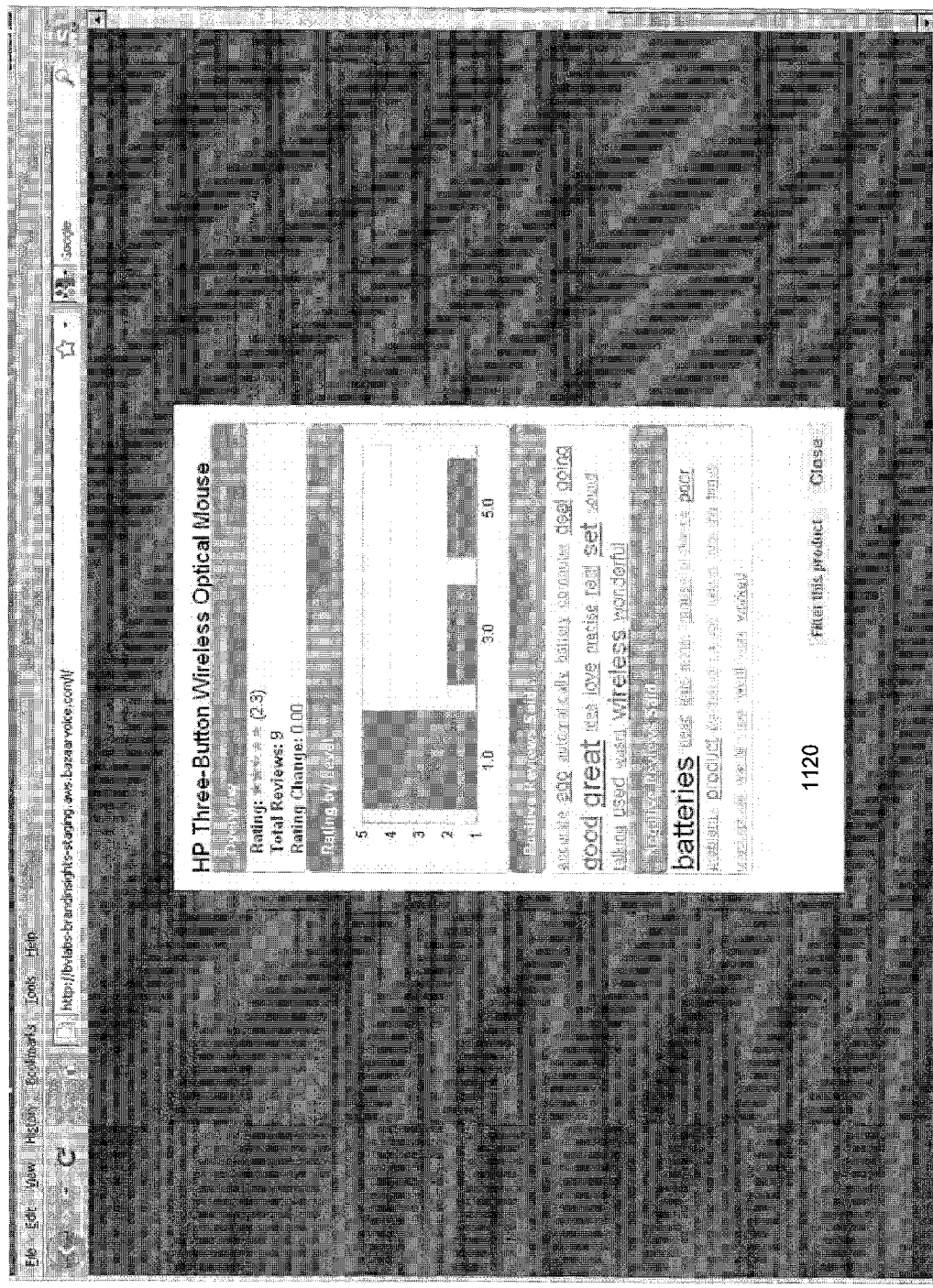
FIG. 11B is a depiction of one embodiment of an interface.
Figure 11C:
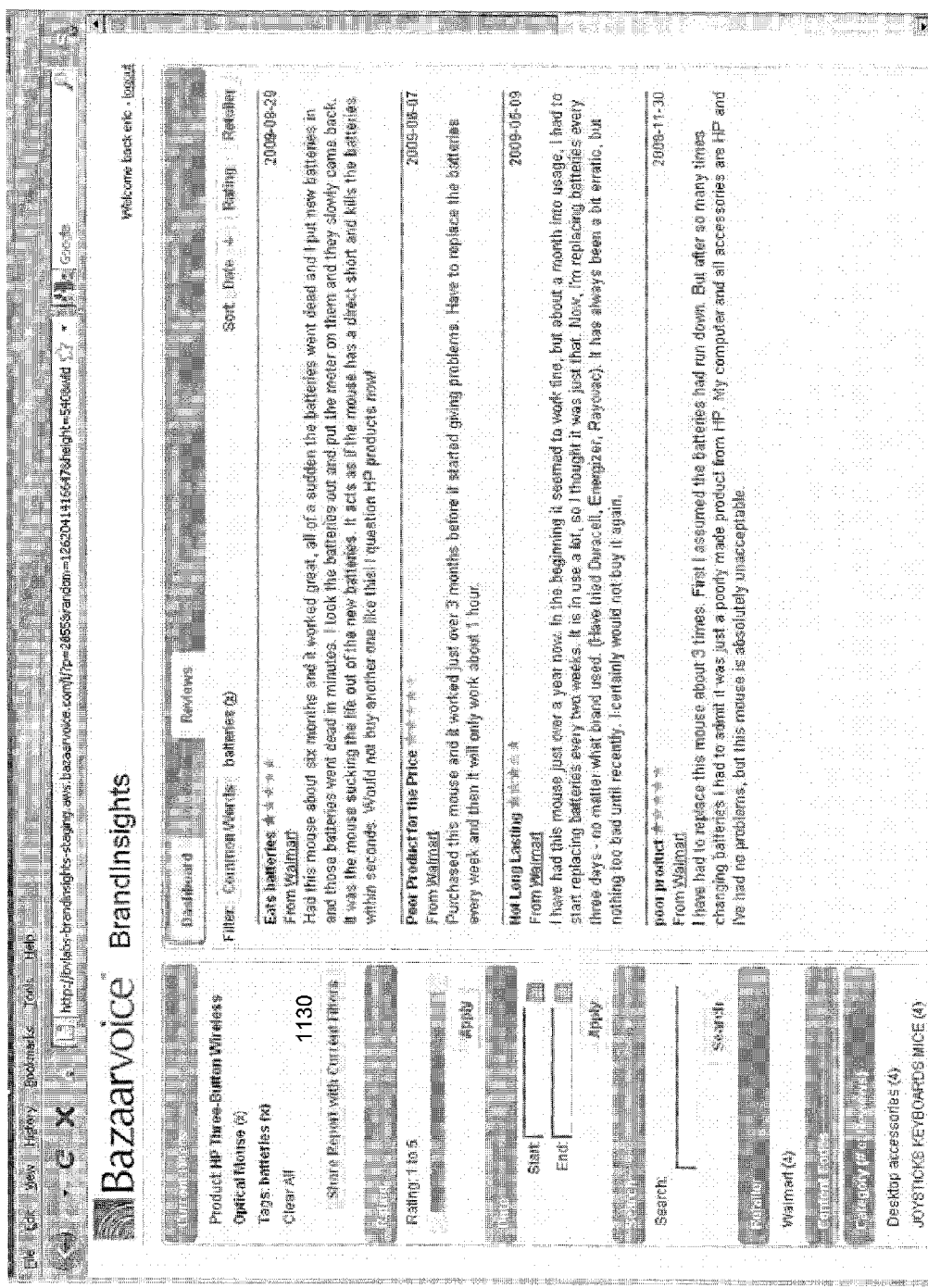
FIG. 11C is a depiction of one embodiment of an interface.
Figure 11D:
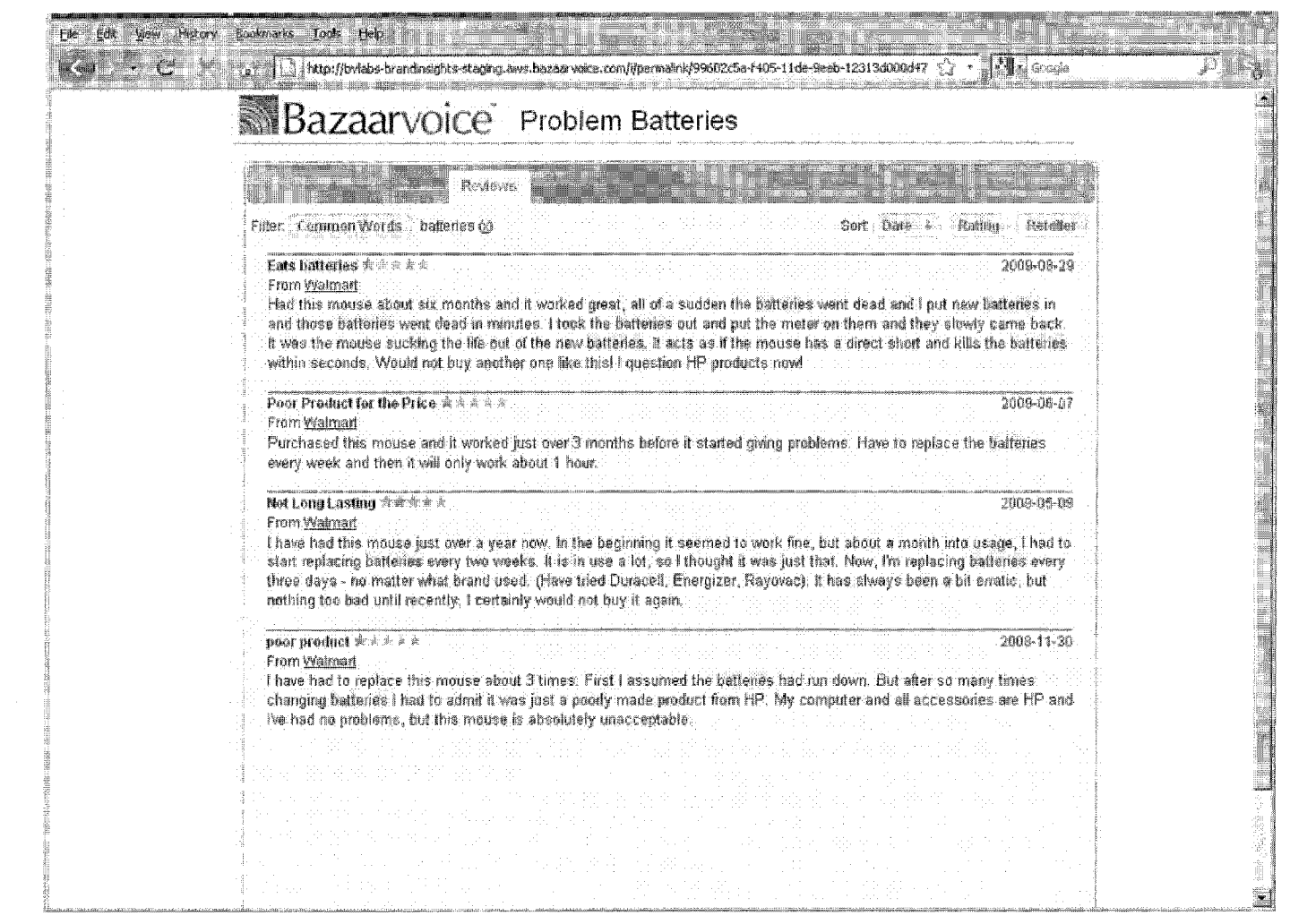

After selecting this product the user may be presented with the embodiment of the interface presented in FIG. 11B which is presents the average rating, the number of reviews generated about the product, the volume of ratings by rating level and an indication of the most frequent words utilized in both positive and negative reviews associated with the "HP Three-Button Wireless Optical Mouse."

The use may next select the word "batteries" from "Negative Reviews Said . . . " area 1120 of the presented product data for the "HP Three-Button Wireless Optical Mouse." The user may then be presented with the embodiment of the interface depicted in FIG. 11C where reviews associated with the manufacturer which have been filtered by the product "HP Three-Button Wireless Optical Mouse" and the word "batteries" are presented to the user. The user may then choose to generate a report for another user by selecting the "Share Report with Current Filter," area 1130. The user can thus generate a report for another user where when this second user accesses such a report it may be presented to him as in the embodiment of the interface depicted in FIG. 11D.

In the foregoing specification, the invention has been described with reference to specific embodiments. However, one of ordinary skill in the art appreciates that various modifications and changes can be made without departing from the scope of the invention as set forth. Accordingly, the specification, appendices and figures are to be regarded in an illustrative rather than a restrictive sense, and all such modifications are intended to be included within the scope of invention, notwithstanding the use of any restrictive terms.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims.

What is claimed is:

1. A method related to user generated content (UGC) that corresponds to different time periods, comprising:

receiving, by a computer system, user generated content (UGC) relating to a plurality of products that are provided by a supplier, wherein the received UGC includes one or more first items and one or more second items of UGC respectively collected from users through a plurality of websites via which individual ones of the plurality of products are available for purchase, and wherein the received UGC includes a plurality of user-submitted ratings, on a defined scale having a minimum and a maximum rating, of individual ones of the plurality of products;

the computer system determining a plurality of changes from an earlier time period to a later time period in user sentiment of two or more of the plurality of products provided by the supplier, wherein the determining is based on a difference on the defined scale between ratings included in the one or more first items of the UGC and ratings included in the one or more second items of the UGC, wherein the earlier time period corresponds to the one or more first items of the UGC, and the later time period corresponds to the one or more second items;

the computer system selecting a particular one of the plurality of products provided by the supplier based on the particular product having a greater magnitude of change in user sentiment from the earlier time period to the later time period than one or more magnitudes of change in user sentiment from the earlier time period to the later time period for one or more other ones of the plurality of products provided by the supplier; and transmitting, by computer system to the supplier, data usable to present the selected particular product.

2. The method of claim 1,
wherein the earlier time period includes one or more first dates that are earlier than one or more second, subsequent dates included in the later time period.

3. The method of claim 1,
wherein the determining the plurality of changes in the user sentiment is further based on respective volumes of received user-submitted ratings for individual one of the plurality of products.

4. The method of claim 1,
wherein the selecting the particular product is based on a change in user sentiment for the particular product having a greatest magnitude of change in user rating on the defined scale of all changes in user rating for the plurality of products that are provided by the supplier.

5. The method of claim 1,
wherein the defined scale is from one point to five points.

6. The method of claim 1, further comprising determining an importance metric for the particular product, wherein the importance metric is determined based on:

first information indicative of ratings in reviews generated for the particular product prior to a particular past date;

second information indicative of ratings in reviews generated for the particular product after the particular past date;

third information indicative of a number count of reviews generated for the particular product prior to the particular past date; and fourth information indicative of a number count of reviews generated for the particular product after to the particular past date.

7. The method of claim 6, wherein the determining the importance metric includes weighting the first and third information more heavily than the second and fourth information.

8. The method of claim 6, further comprising transmitting, to the supplier, information indicative of the importance metric for the particular product, wherein the information indicative of the importance metric indicates that the particular product is of more importance to the supplier than one or more others of the plurality of products.

9. A system, comprising:
one or more processors;
memory coupled to the one or more processors, the memory having stored thereon instructions executable by the system, using the one or more processors, to cause the system to
perform operations including:
receiving user generated content (UGC) relating to a plurality of products provided by a supplier, wherein the received UGC includes one or more first and one or more second items of UGC respectively collected from users through a plurality of websites via which individual ones of the plurality of products are available for purchase, wherein the received UGC includes a plurality of user-submitted ratings, on a defined scale, of individual ones of the plurality of products;

determining a plurality of changes from an earlier time period to a later time period in user sentiment of two or more of plurality of products, wherein the determining is based on a difference on the defined scale between ratings included in the one or more first items of the UGC and ratings included in the one or more second items of the UGC, wherein the earlier time period corresponds to the one or more first items of the UGC, and the later time period corresponds to the one or more second items;

selecting a particular one of the plurality of products provided by the supplier based on the particular product having a greater magnitude of change in user sentiment from the earlier time period to the later time period than one or more magnitudes of change in user sentiment from the earlier time period to the later time period for one or more other ones of the plurality of products provided by the supplier; and transmitting, to the supplier, data usable to present the selected particular product.

10. The system of claim 9,
wherein one or more of the plurality of products corresponds to one or more services.

11. The system of claim 9,
wherein said determining the plurality of changes in user sentiment is based on a change in an average rating corresponding to the one or more first items of the UGC.

12. The system of claim 9,
wherein the first and second items of UGC include comments relating to the individual ones of the plurality of products; and
wherein the determining the plurality of changes in user sentiment is based on a quantity of negative terms appearing in the comments.

13. The system of claim 9,
wherein the first and second items of UGC include questions relating to the individual ones of the plurality of products; and
wherein the determining the plurality of changes in user sentiment is based on a quantity of the questions relating to the individual ones of the plurality of products.

14. The system of claim 9, wherein the selecting includes identifying a group of one or more products that belong to a same brand.

15. The system of claim 9, wherein the data usable to present the selected particular product includes data representative of a visual graph.

16. The system of claim 9,
wherein the determining the plurality of changes in user sentiment is based on a change in a distribution of ratings corresponding to the one or more first items of the UGC as compared to ratings corresponding to the one or more second items of the UGC.

17. An article of manufacture comprising a non-transitory computer-readable medium having stored thereon instructions executable, by a computer system, to cause the computer system to perform operations comprising:

receiving user generated content (UGC) relating to a plurality of products that are provided by a supplier, wherein the received UGC includes a plurality of individual items of UGC respectively collected from users through a plurality of web sites via which individual ones of the plurality of products are available for purchase from one or more sellers that are different from the supplier, wherein the received UGC includes a plurality of user-submitted ratings, on a defined scale, of individual ones of the plurality of products;

determining a plurality of changes in user sentiment of the individual ones of the plurality of products, wherein the determining is based on a difference on the defines scale between ratings included in one or more first items of the UGC and ratings included in one or more second items of the UGC, wherein the first and second items respectively correspond to earlier and later periods of time;

selecting a particular one of the plurality of products provided by the supplier based on the particular product having a greater magnitude of change in user sentiment from the earlier time period to the later time period than one or more magnitudes of change in user sentiment from the earlier time period to the later time period for one or more other ones of the plurality of products; and transmitting, to the supplier, data usable to present the selected particular product.

18. The article of manufacture of claim 17, wherein the determining the plurality of changes in user sentiment is based on a difference between:
    a first metric corresponding to items of UGC collected during a first time period; and
    a second metric corresponding to items of UGC collected during a second time period.

19. The article of manufacture of claim 17,
    wherein at least one of the first or second individual items of UGC include answers to questions relating to individual ones of the plurality of products; and
    wherein the determining the plurality of changes in user sentiment is based on a quantity of the answers to the questions.

20. The article of manufacture of claim 17, wherein the operations further comprise receiving input specifying the earlier and later periods of time.

21. The article of manufacture of claim 17,
    wherein one or more of the plurality of products corresponds to one or more services; and
    wherein the plurality of websites correspond to two different service providers.

22. The article of manufacture of claim 17,
    wherein the supplier is a manufacturer of the plurality of products; and
    wherein the plurality of websites are associated with one or more resellers of one or more of the plurality of products.

* * * * *